(12) United States Patent
Fuji

(10) Patent No.: US 6,522,999 B2
(45) Date of Patent: Feb. 18, 2003

(54) APPARATUS AND METHOD FOR CONTROLLING THE DISPLAY OF A TRANSLATION OR DICTIONARY SEARCHING PROCESS

(75) Inventor: Masaru Fuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/102,359

(22) Filed: Jun. 23, 1998

(65) Prior Publication Data

US 2002/0013693 A1 Jan. 31, 2002

(30) Foreign Application Priority Data

Dec. 15, 1997 (JP) .............................................. 9-345197

(51) Int. Cl.[7] .............................................. G06F 17/28
(52) U.S. Cl. ................................ 704/2; 704/3; 707/536
(58) Field of Search .............................. 704/2, 3, 4, 5, 704/6, 7, 8, 10; 707/1, 2, 3, 5, 6, 7, 500, 513, 530, 531, 532, 533, 536; 345/115, 171, 326, 346

(56) References Cited

U.S. PATENT DOCUMENTS

| | | | | |
|---|---|---|---|---|
| 5,349,368 A | * | 9/1994 | Takeda et al. | 345/115 |
| 5,416,903 A | * | 5/1995 | Malcolm | 345/333 |
| 5,612,872 A | * | 3/1997 | Fujita | 704/2 |
| 5,659,765 A | * | 8/1997 | Nii | 704/4 |
| 5,677,835 A | * | 10/1997 | Carbonell et al. | 704/8 |
| 5,822,720 A | * | 10/1998 | Bookman et al. | 704/3 |
| 5,848,386 A | * | 12/1998 | Motoyama | 704/5 |
| 5,987,402 A | * | 11/1999 | Murata et al. | 704/2 |
| 5,995,920 A | * | 11/1999 | Carbonell et al. | 704/9 |

* cited by examiner

Primary Examiner—Patrick N. Edouard
(74) Attorney, Agent, or Firm—Staas & Halsey LLP

(57) ABSTRACT

When data is converted between a first data and a second data, a relevant information conversion unit performs a process of the first data also on a third data associated with the first data, and outputs the third data associated with the first data as having the same data type as the second data. Thus, original information and the relevant information can be displayed as the same data type.

26 Claims, 36 Drawing Sheets

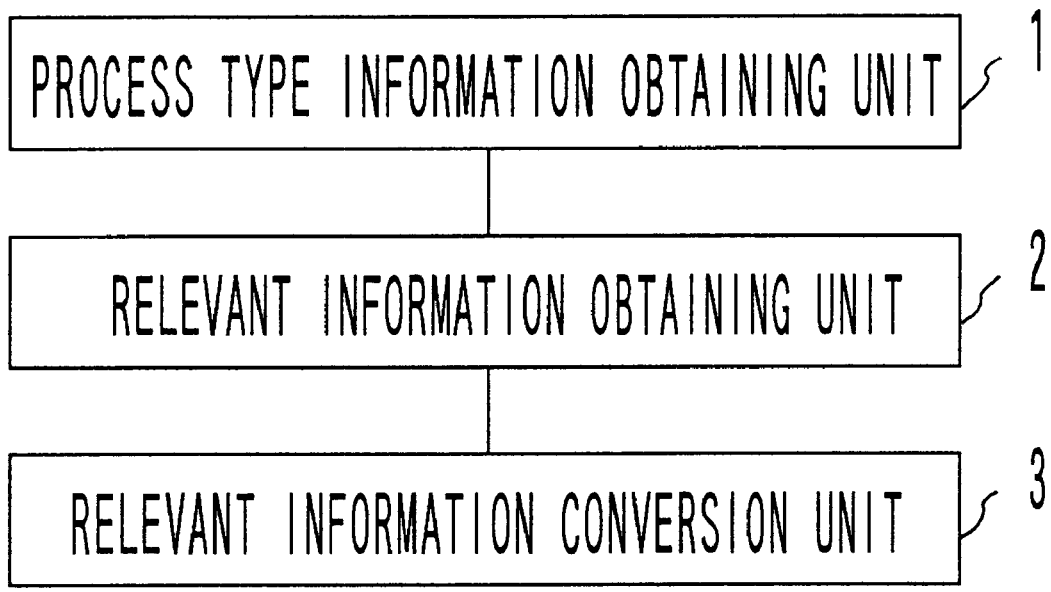
F I G. 1

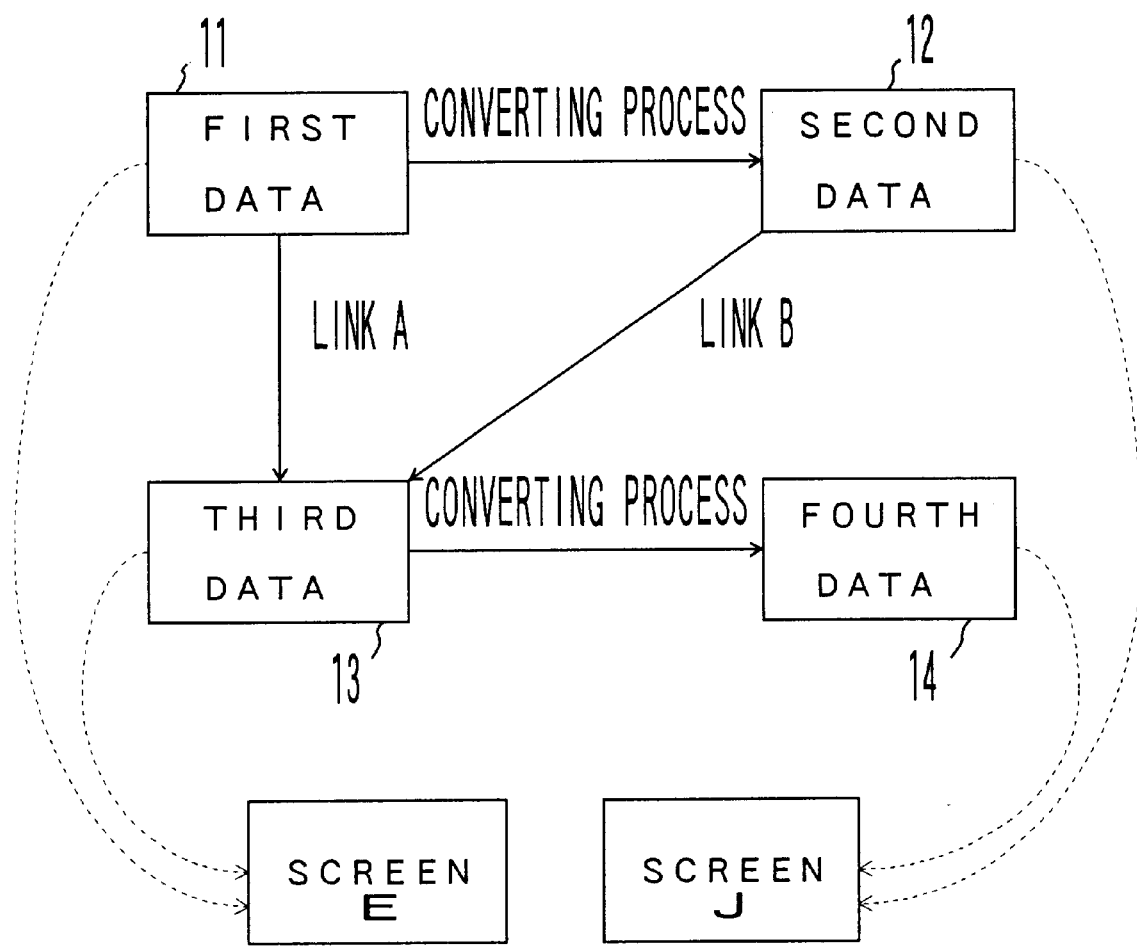
F I G. 2

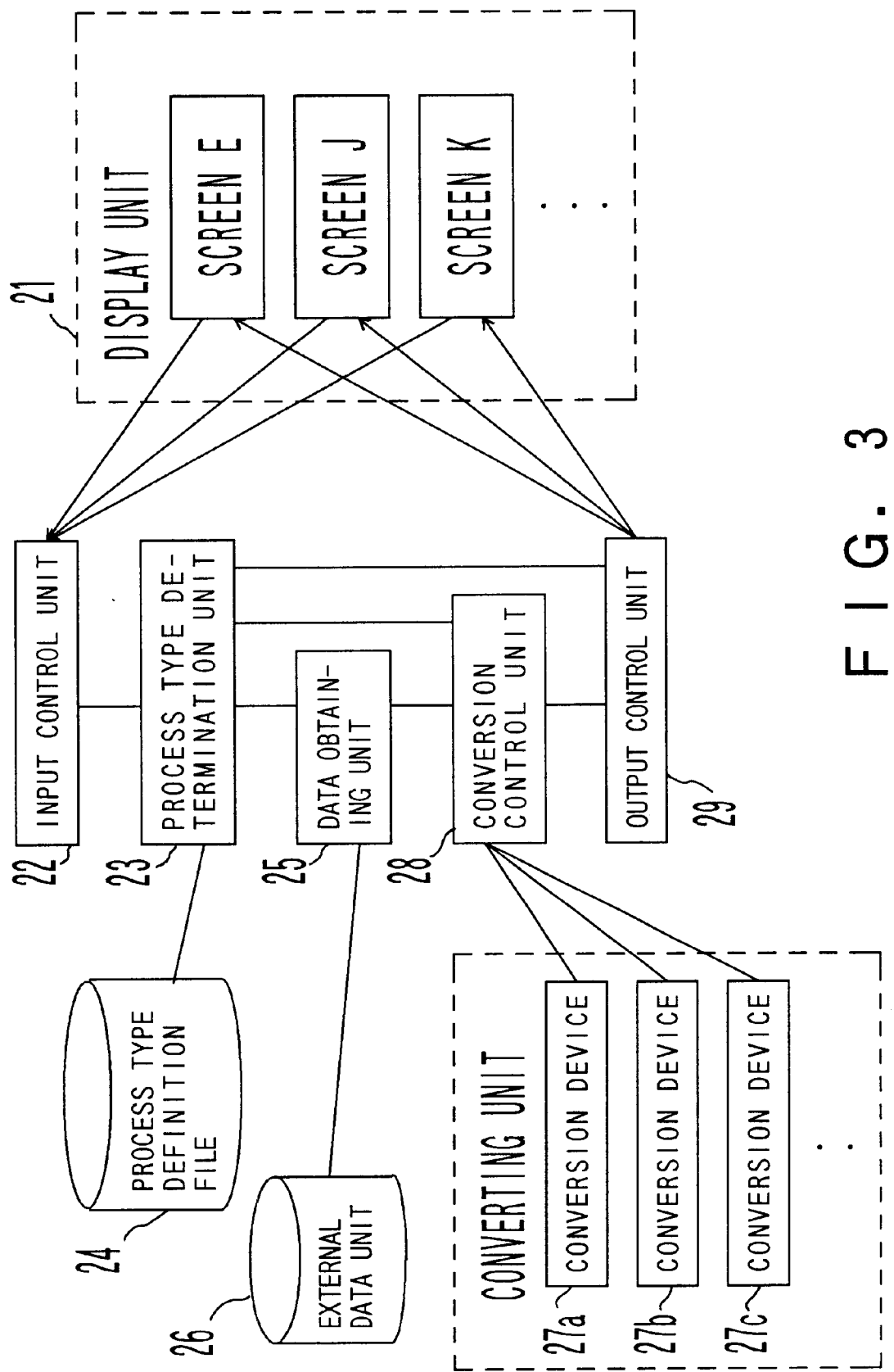
F I G. 3

SCREEN E

DOCUMENT 1E

There is a book on the table. And there are  on the floor.

HYPERLINK 71 TO DOCUMENT 2E

SCREEN J

DOCUMENT 1J

テーブルの上に本があります。また、床にはがあります。

HYPERLINK 72 TO DOCUMENT 2E

FIG. 11A

DOCUMENT 2E

It's a fine day today.

⇒ ENGLISH-JAPANESE MACHINE TRANSLATION

DOCUMENT 2J

SCREEN E

DOCUMENT 1E

There is a book on the table. And there are 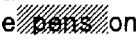 on the floor.

HYPERLINK 71 TO DOCUMENT 2E

SCREEN J

DOCUMENT 2J

| INPUT SCREEN REFERRED-TO DOCUMENT | SCREEN J DOCUMENT 2E |
|---|---|

FIG. 12A

| LANGUAGE OF REFERRED-TO DOCUMENT | LANGUAGE FOR INPUT SCREEN | CONVERTING PROCESS |
|---|---|---|
| ENGLISH | JAPANESE | ENGLISH-JAPANESE TRANSLATION |
| ENGLISH | ENGLISH | NO CONVERSION |
| JAPANESE | ENGLISH | JAPANESE-ENGLISH TRANSLATION |
| JAPANESE | JAPANESE | NO CONVERSION |

FIG. 12B

| OBTAINING DOCUMENT 2E |
|---|
| PERFORMING ENGLISH-JAPANESE TRANSLATION ON OBTAINED DOCUMENT 2E INTO DOCUMENT 2J |
| DISPLAYING DOCUMENT 2J ON SCREEN J |

FIG. 12C

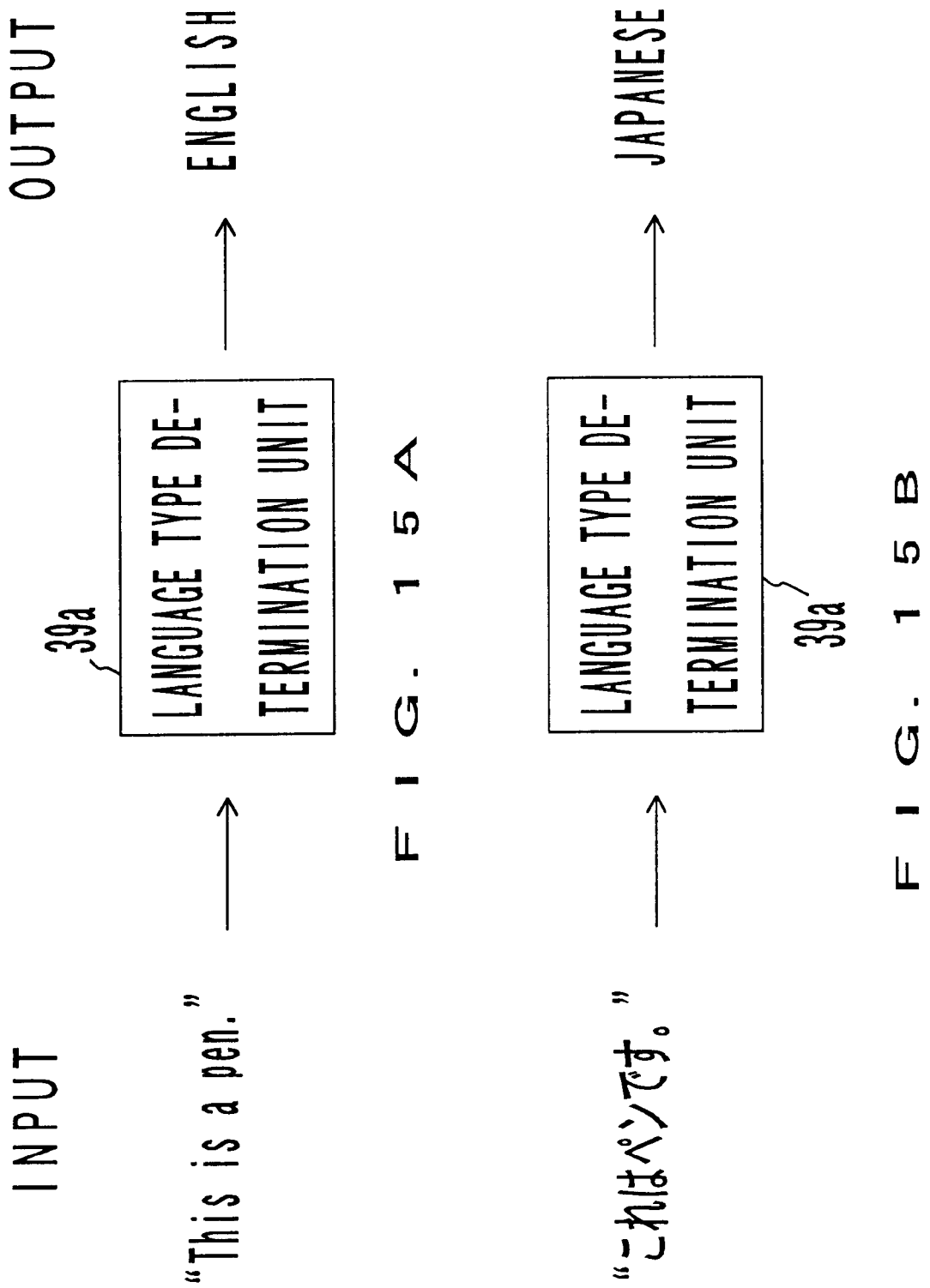

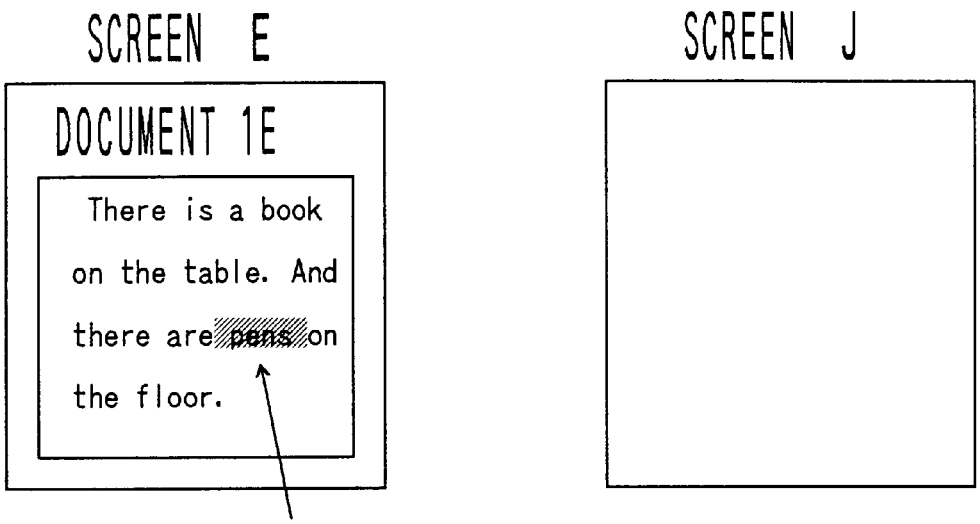
FIG. 17A
| SCREEN E | DISPLAYING |
| SCREEN J | NOT DISPLAYING |
FIG. 17B
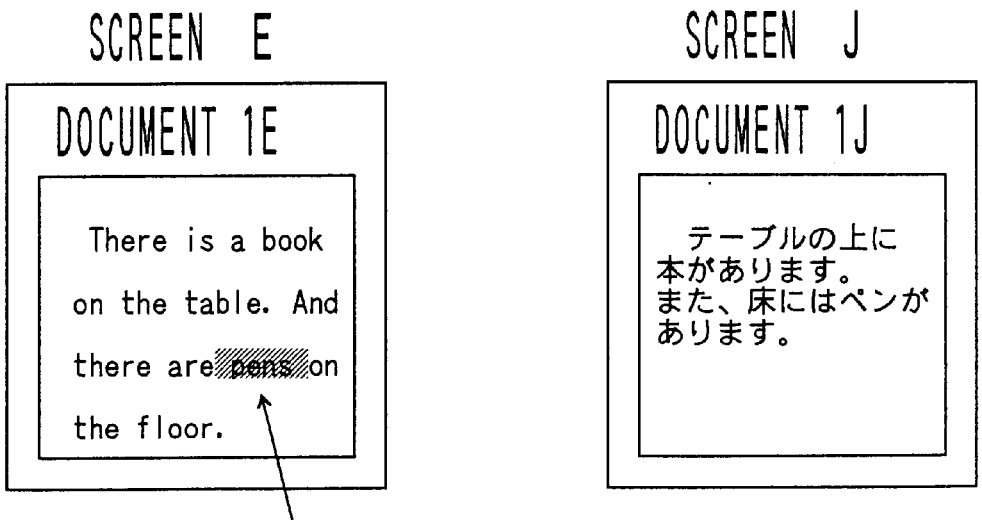
FIG. 17C

| PRIORITY | PROCESS CONTENTS |
|---|---|
| 1 | OBTAINING DATA FROM CACHE |
| 2 | OBTAINING DATA FROM HARD DISK |
| 3 | OBTAINING EXTERNAL DATA THROUGH HIGH-SPEED LINE |
| 4 | OBTAINING DATA FROM CACHE AND PERFORMING MACHINE TRANSLATION PROCESS |
| 5 | OBTAINING EXTERNAL DATA THROUGH TELEPHONE LINE |

FIG. 19

| SCREEN | CHARACTER CODE |
|---|---|
| SCREEN E | LATIN 1 TYPE |
| SCREEN J | AUTOMATIC IDENTIFICATION OF JAPANESE |

FIG. 22

SCREEN E
DOCUMENT 1E
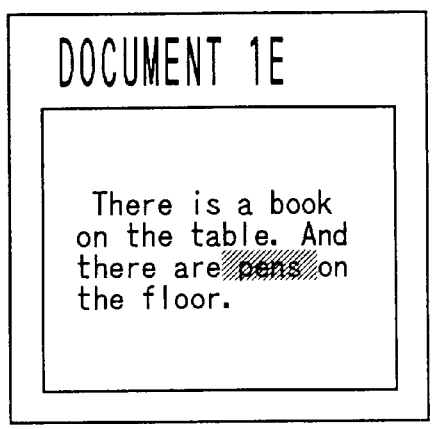
HYPERLINK 71 TO DOCUMENT 2E
SCREEN J
DOCUMENT 1J
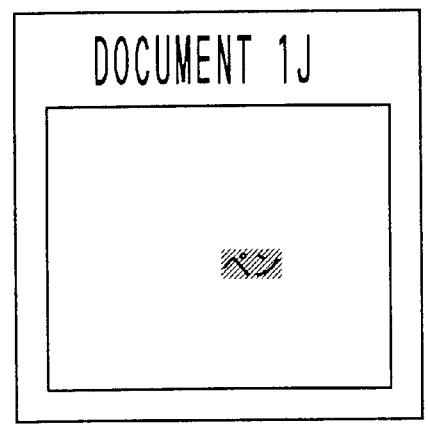
HYPERLINK 72 TO DOCUMENT 2E
FIG. 26

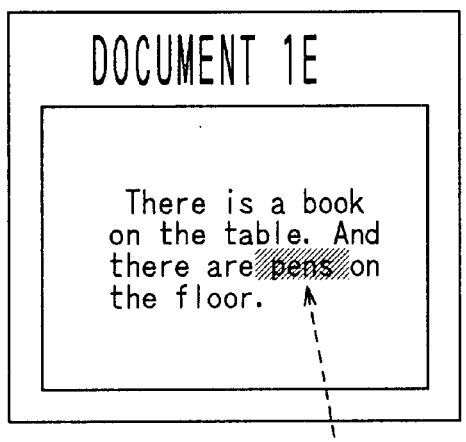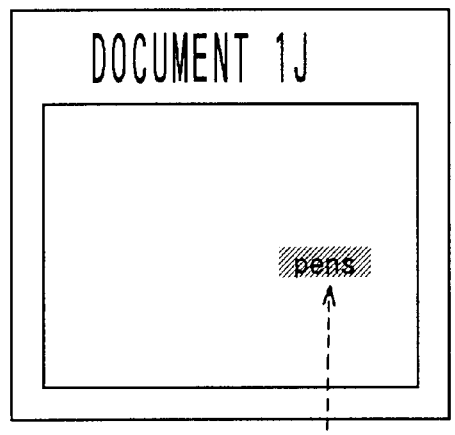
FIG. 28

SCREEN E

DOCUMENT 1E

There is a book on the table. And there are pens on the floor.

HYPERLINK 91 TO DOCUMENT 2E

SCREEN J

DOCUMENT 1J

テーブルの上に本があります。また、床には××があります。

HYPERLINK 92 TO DOCUMENT 2E

FIG. 31

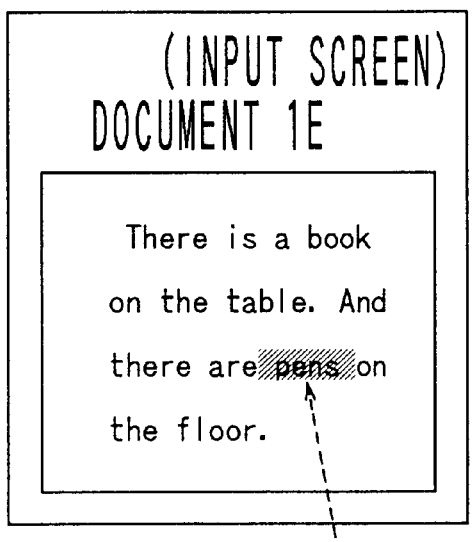 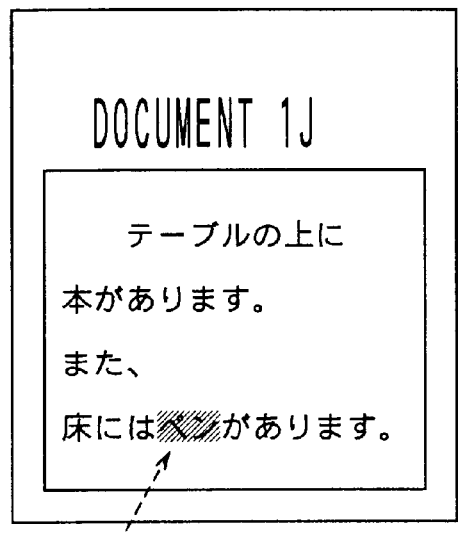
FIG. 33

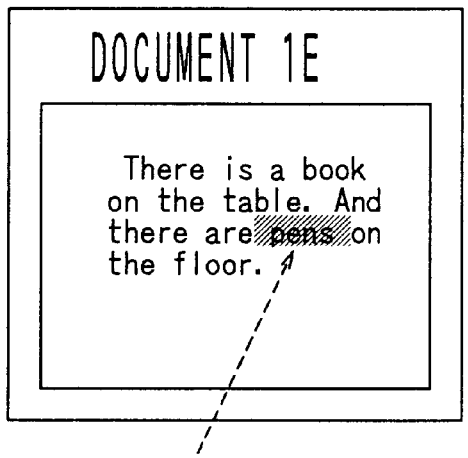 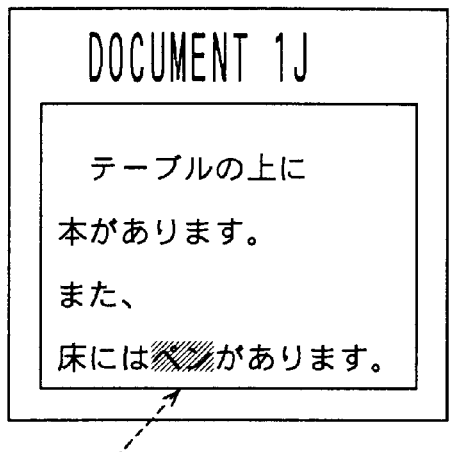
FIG. 34A
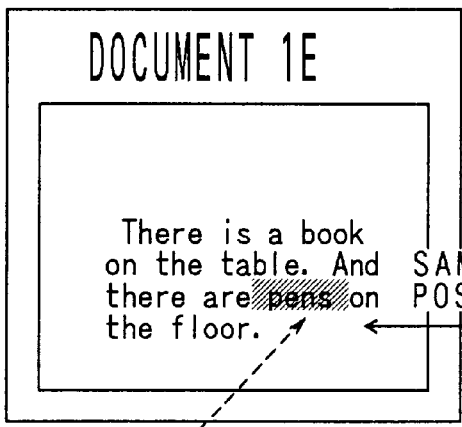 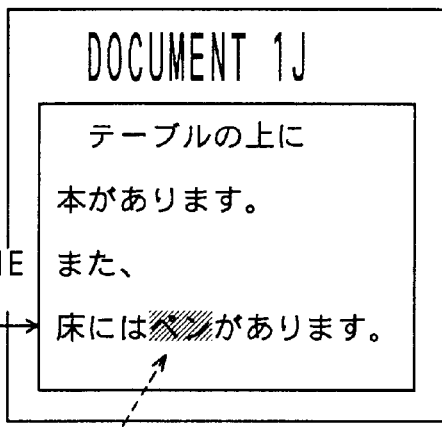
FIG. 34B

SCREEN E

DOCUMENT 1E

There is a book on the table. And there are *pens* on the floor.

HYPERLINK 71 TO DOCUMENT 2E

SCREEN J

DOCUMENT 1J

テーブルの上に
本があります。
また、
床には※※があります。

HYPERLINK 72 TO DOCUMENT 2E

F I G. 3 5 A

SCREEN E

DOCUMENT 1E

There is a book on the table. And there are *pens* on the floor.

HYPERLINK 71 TO DOCUMENT 2E

SCREEN J

DOCUMENT 1J

また、
床には※※があります。

HYPERLINK 72 TO DOCUMENT 2E

F I G. 3 5 B

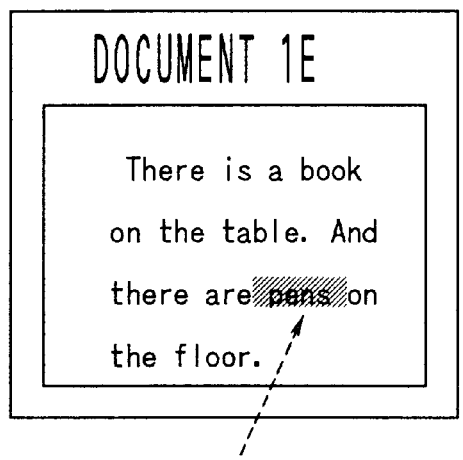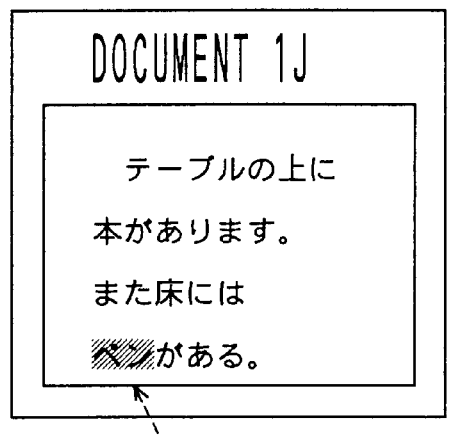
FIG. 36A
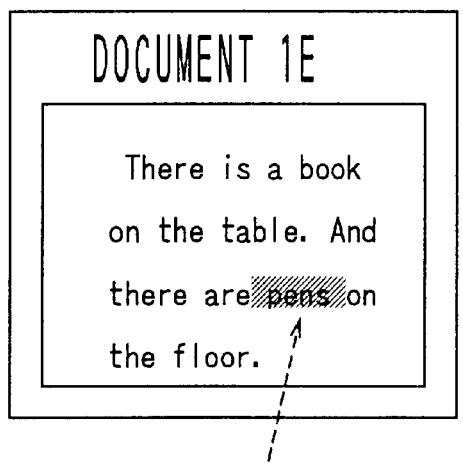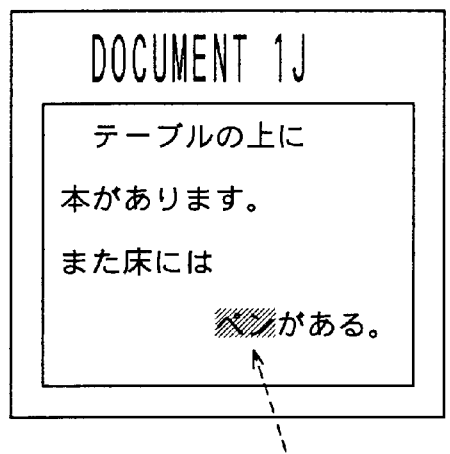
FIG. 36B

APPARATUS AND METHOD FOR CONTROLLING THE DISPLAY OF A TRANSLATION OR DICTIONARY SEARCHING PROCESS

BACKGROUND OF THE INVENTION

1. Field of the Invention

The present invention relates to an output control apparatus, and can be applied to a hypermedia system for processing data with words, text, image, voice, etc. associated with each other.

2. Description of the Related Art

According to the conventional technology, when an original text screen has a link structure on a machine-translated text screen, the link structure can be embedded in an optional position on the translated text screen. For example, when original text contains a hyperlink, the hyperlink is embedded at an appropriate position in the translated text for display.

On such a translated text screen, the hyperlink in the translated text can be processed by performing the same operation as the hyperlink in the original text.

However, on the conventional machine-translated text screen, a document referred to by a hyperlink embedded in the original text is written in the language of the original text. Therefore, if the hyperlink of the original text is simply embedded in the translated text, the referred-to document is also written in the language of the original text. As a result, the document written in the language of the original text is displayed when a hyperlink in the translated text is processed.

In this case, documents written in different languages can be alternately displayed on the same screen, thereby often confusing the users.

SUMMARY OF THE INVENTION

The present invention aims at providing an output control apparatus capable of displaying the original information and relevant information in the same data type.

The present invention includes a process type information obtaining unit for obtaining process type information for use in converting the first data into the second data; a relevant information obtaining unit for obtaining the third data relevant to the first data; and a relevant information conversion unit 3 for converting the third data into the fourth data.

If data is converted between the first data and the second data, the converting process performed on the first data can also be performed on the third data relevant to the first data so that the third data relevant to the first data can be output in the same data type as the second data.

According to an aspect of the present invention, a process type indicates a translating process or a dictionary searching process.

Therefore, when a hyperlink in the original text is processed with the original text and the translated text containing the hyperlinks displayed in the bilingual format, the document referred to by the hyperlink can be output with the original text and the translated text in the bilingual format.

Another aspect of the present invention includes an output control unit for controlling the output of the fourth data from the first data.

With the configuration, the following processes can be realized. That is, the original text referred from by the hyperlink and the translated text can be output in the bilingual format. The original text and the translated text referred to by the hyperlink can also be output in the bilingual format. Furthermore, the original text referred from by the hyperlink and the translated text referred to by the hyperlink can be output in the bilingual format. The original text referred to by the hyperlink and the translated text referred from by the hyperlink can also be output in the bilingual format. Thus, various display methods can be realized according to the present invention.

A further aspect of the present invention includes a first display screen for displaying data according to the first display format; a second display screen for displaying data according to the second display format: and a display control unit for first converting the referred-to information into the data in the second display format and then displaying the converted information on the second display screen when the information referred to by the hypermedia data displayed on the first display screen is displayed on the second display screen.

With the configuration, data can be displayed on the first display screen according to the first display format, and on the second display screen according to the second display format even if the information referred to by the hypermedia data is contained in any data type. As a result, even if the information referred to by the hypermedia data is represented in any language, the languages displayed on the first and second display screens can be represented in the language of the referred-from text, thereby preventing the displayed information from being represented in different languages on the same screen when a hyperlink is processed.

A further aspect of the present invention includes a first display control unit for displaying data of the first data type on the first display screen; a second display control unit for displaying data of the second data type on the second display screen; a third display control unit for first converting the referred-to information into the data of the second data type and then displaying the converted information on the second display screen when the referred-to information is displayed as the data of the first data type on the first display screen.

With the configuration, the referred-to information can be displayed as the data of the second data type on the second display screen only by displaying the referred-to information as the data of the first data type on the first display screen, thereby matching the contents displayed on the first display screen with the contents displayed on the second display screen by performing a simple operation.

A further aspect of the present invention includes a first display control unit for displaying the first data on the first display screen; a second display control unit for converting the first data into the second data and then displaying the converted data on the second display screen; and a third display control unit for controlling the displayed contents of the second data with the change in the displayed contents of the first data.

With the configuration, for example, the displayed contents of translated text can be automatically changed when the displayed contents of original text are changed even if the displayed contents of the original text change as a result of the scrolling or editing operation on the original text with the original text and the translated text displayed in the bilingual format. Thus, the original text and the translated text can be conveniently displayed in the bilingual format.

A further aspect of the present invention includes a display unit provided with a plurality of display screens; an input control unit for monitoring display formats on the display screens; a process type determination unit for determining the process type of hyper-document data based on the display format on a specified display screen; a data obtaining unit for obtaining the document data referred to by the hyper-document data; a process type definition file for storing the process contents of the referred-to document data based on the process type; a conversion control unit for controlling the conversion of the document data referred to by the hyper-document data based on the contents of the process type definition file; and an output control unit for outputting a process result of the referred-to document data on the specified display screen.

With the configuration, the document referred to by a hyperlink can be represented as translated text even if the hyperlink of the original text is embedded as is in the translated text, the document referred to by the hyperlink embedded in the original text is described in the language of the original text, and the hyperlink is processed in the translated text. As a result, the referred-to document can be displayed in the language of the original text on the screen on which the original text is displayed, and the referred-to document can be displayed in the language of the translated text on the screen on which the translated text is displayed. Thus, a document written in different languages can be prevented from being alternately displayed in the different languages on the same screen.

According to a further aspect of the present invention, a process result of referred-to document data can be simultaneously displayed on a display screen when the referred-to document data is displayed on another display screen.

Thus, the referred-to document data before the conversion of the data and the referred-to document data after the conversion of the data can be displayed in the comparison format, thereby improving the convenience of the user.

According to a further aspect of the present invention, the document type of the referred-to document data matches the document type of the referred-from document data by determining the document type of document data.

Therefore, even if the hyperlink of the original text is embedded as is in the translated text and the language of the document referred to by the hyperlink embedded in the original text is not known, the language of the document referred to by the hyperlink is automatically determined, and the referred-to document is converted into the language of the translated text for display, thereby improving the convenience of the user.

According to a further aspect of the present invention, the language type of the document data can be determined by checking the ratio of the character type contained in the document data.

Thus, the language type can be easily determined by the simple method.

According to a further aspect of the present invention, a new screen is generated when a screen corresponding to the document type does not exist.

Thus, the character code displayed on each screen can be controlled by each description language.

Thus, document data can be displayed for each document type, and different types of documents can be displayed in the comparison format.

According to a further aspect of the present invention, the output order of document data can be controlled based on the process time of the obtained document data.

Thus, it is possible to prevent the output of the document data obtained within a short period from being delayed by the document data which takes a long time, thereby efficiently outputting document data.

According to a further aspect of the present invention, when it takes a long time to obtain the entire document data, a converting process is performed on a part of the document data to be obtained.

Thus, the document data can be obtained and simultaneously converted. Therefore, it is not necessary to keep the document data converting process waiting until the entire data is obtained. As a result, the conversion result of the document data can be quickly output.

According to a further aspect of the present invention, a character code on a corresponding screen can be controlled by the description language when the description language is used as a data type.

Thus, the character code displayed on each screen can be controlled by each description language.

According to a further aspect of the present invention, a hyperlink can be seen by controlling the display position of the hyper-document data when the hyperlink of the hyper-document data is hidden under another screen.

Thus, the referred-to document data can be easily processed even when the screens of hyper-document data overlap each other for display.

According to a further aspect of the present invention, only a hyperlink of hyper-document data can be converted and displayed when the hyper-document data cannot be successfully converted.

Thus, even if a conversion result of hyper-document data cannot be obtained, only the hyperlink can be converted and displayed in the comparison format, thereby easily accessing the referred-to document data.

According to a further aspect of the present invention, a hyperlink before the conversion is displayed when the hyper-document data and the hyperlink cannot be successfully converted.

Thus, the referred-to document data can be accessed in the comparison format on the screen even if a conversion result cannot be obtained from the hyper document data.

According to a further aspect of the present invention, the corresponding portions between the data before conversion and the data after conversion can be simultaneously displayed.

Therefore, when one screen is scrolled, another screen can be automatically scrolled, thereby improving the convenience of the user.

According to a further aspect of the present invention, the corresponding portions between the data before conversion and the data after conversion can be displayed at the same position on each screen.

Therefore, a specified word or sentence in the original text displayed on one screen can be easily located in the translated text displayed on another screen, there improving the convenience to the user when the user compares the original text and the translated text.

According to a further aspect of the present invention, the screen for displaying the document data before conversion and the screen for displaying the document data after conversion match each other in position at which a hyperlink is displayed.

Therefore, the correspondence of the hyperlinks can be easily obtained between the screen displaying the document data before conversion and the screen displaying the document data after conversion.

According to a further aspect of the present invention, the character size, character spacing, line spacing, or line feed position can be controlled to set the position at which data is displayed.

Thus, even if the numbers of characters are different between the original text and the translated text, the corresponding portions between the original text and the translated text can be displayed on the same position on each screen by reducing the character size, character spacing, line spacing, or number of line feeds of the text containing a larger number of characters.

According to a further aspect of the present invention, the display position of a hyperlink can be controlled by scrolling the document data on the screen.

Thus, the hyperlinks can be easily set at corresponding display positions even if they are currently displayed at different positions between the screen displaying the document data before conversion and the screen displaying the document data after conversion.

According to a further aspect of the present invention, the reference records of referenced hyperlinks on a screen can be displayed on another corresponding screen.

Thus, by only referring to a hyperlink on one screen, reference records can be coincidentally displayed between the screen displaying the document data before conversion and the screen displaying the document data after conversion. As a result, the convenience in referring to relevant information can be improved by referring to the relevant information on either screen.

According to a further aspect of the present invention, the method for displaying a referenced hyperlink is different from the method for displaying a non-referenced hyperlink.

Thus, a hyperlink referenced before can be easily identified, thereby improving the convenience when relevant information is requested.

According to a further aspect of the present invention, the size of a screen can be controlled depending on the amount of data before and after conversion.

Thus, even if the numbers of characters are different between the original text and the translated text, the corresponding portions of the original text and the translated text can be displayed in the corresponding line on the screens by setting the width of the screen for a document containing a larger number of characters longer than the width of the screen for another document having a smaller number of characters, thereby improving the convenience of the user when the original text and the translated text are displayed in the bilingual format on the screen.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 1 is a block diagram showing the configuration of the output control apparatus according to an embodiment of the present invention;

FIG. 2 is a block diagram showing an example of the output control method according to an embodiment of the present invention;

FIG. 3 is a block diagram showing the configuration of the screen control apparatus according to the first embodiment of the present invention;

FIG. 11A shows an example of displaying an English-Japanese bilingual document;

FIG. 11B shows the English-Japanese translation result of the referred-to document;

FIG. 11C shows the first example of displaying the English-Japanese translation result of the referred-to document;

FIG. 12A shows an example of the contents of input information;

FIG. 12B shows an example of the contents of the process type definition file;

FIG. 12C shows the first example of the contents of the process type information;

FIGS. 15A and 15B show the method of determining a language type according to an embodiment of the present invention;

FIG. 17A shows an example of displaying an English document;

FIG. 17B shows an example of the contents of a screen display state management table;

FIG. 17C shows an example of displaying an English-Japanese bilingual document;

FIG. 19 shows an example of the contents of the display order definition table according to an embodiment of the present invention;

FIG. 22 shows an example of the contents of the character code correspondence table according to an embodiment of the present invention;

FIG. 26 shows the first example of displaying the hyperlink in an English-Japanese bilingual document;

FIG. 28 shows the second example of displaying the hyperlink in an English-Japanese bilingual document;

FIG. 31 shows the third example of displaying the hyperlink in an English-Japanese bilingual document;

FIG. 33 shows the fourth example of displaying the hyperlink in an English-Japanese bilingual document;

FIG. 34A shows the first example of displaying an English-Japanese bilingual document before adjusting the line positions of the hyperlinks;

FIG. 34B shows the first example of displaying an English-Japanese bilingual document after adjusting the line positions of the hyperlinks;

FIG. 35A shows the second example of displaying an English-Japanese bilingual document before adjusting the line positions of the hyperlinks;

FIG. 35B shows the second example of displaying an English-Japanese bilingual document after adjusting the line positions of the hyperlinks;

FIG. 36A shows an example of displaying an English-Japanese bilingual document before adjusting the column positions of the hyperlinks; and FIG. 36B shows an example of displaying an English-Japanese bilingual document after adjusting the column positions of the hyperlinks.

DESCRIPTION OF THE PREFERRED EMBODIMENTS

Figure 4:
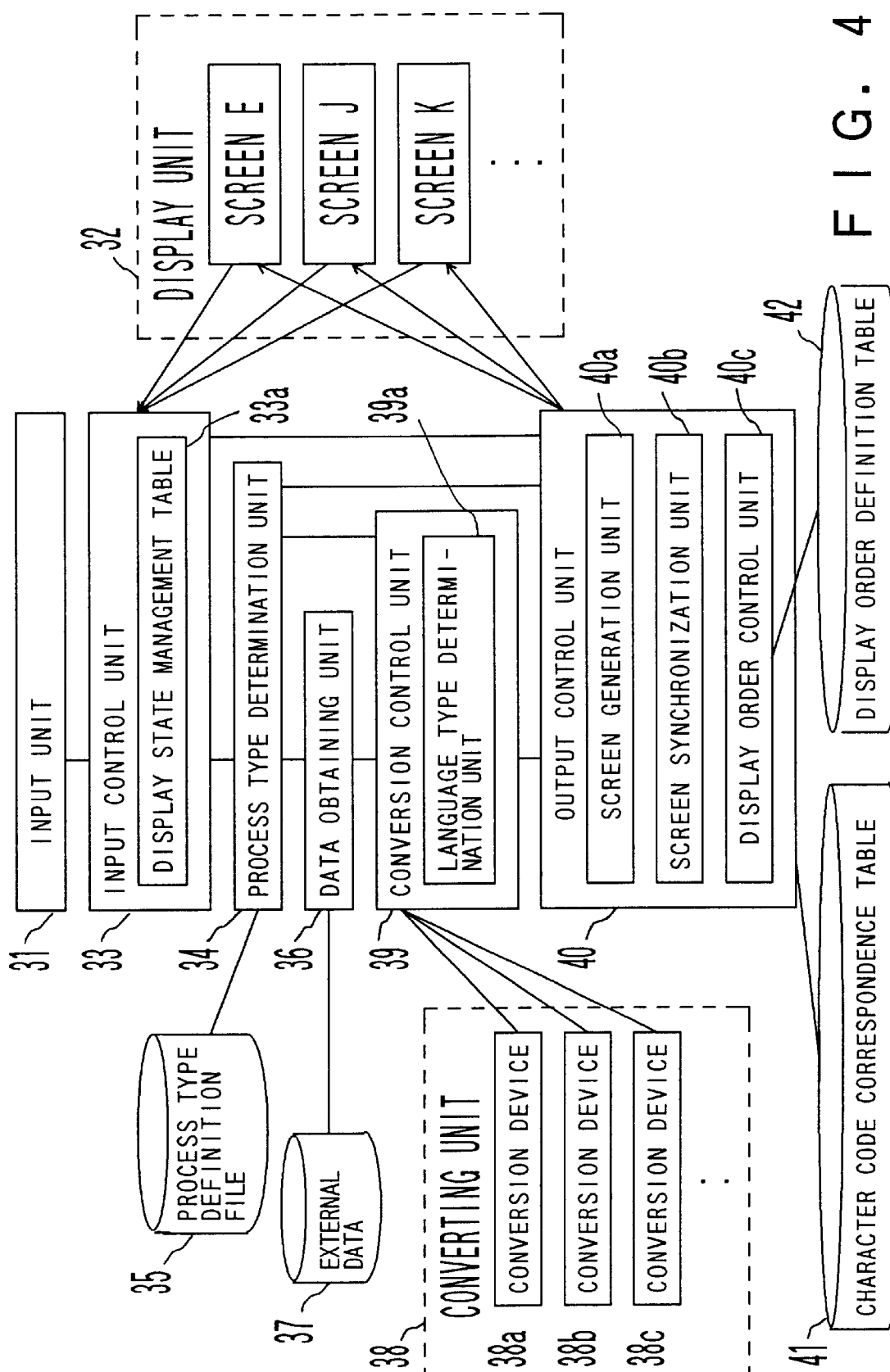
FIG. 4 is a block diagram showing the configuration of the screen control apparatus according to the second embodiment of the present invention.

The output control apparatus according to an embodiment of the present invention is described below by referring to the attached drawings.

FIG. 1 is a block diagram showing the configuration of the output control apparatus according to an embodiment of the present invention. In FIG. 1, a process type information obtaining unit 1 obtains process type information for use in converting the first data into the second data. A relevant information obtaining unit 2 obtains the third data relevant to the first data. A relevant information conversion unit 3 converts the third data obtained by the relevant information obtaining unit 2 into the fourth data according to the process type information obtained by the process type information obtaining unit 1.

When data is converted between the first data and the second data, the relevant information conversion unit 3 can perform on the third data the converting process performed on the first data relevant to the first data, and can output the third data relevant to the first data using the data type of the second data. As a result, when hypermedia data is converted, the data relevant through a hyperlink can be output in the same data type. Therefore, when a hyperlink is referred to for relevant information, the information can be prevented from being output in different data types.

FIG. 2 is a block diagram showing an example of the output control method according to an embodiment of the present invention.

In FIG. 2, first data 11 belongs to the first data type, and is associated with third data 13 through a link A embedded in the first data 11. The third data 13 is assumed to belong to the first data type. The first data 11 is converted into second data 12 in the converting process. The link structure of the first data 11 is embedded in the second data 12, and the second data 12 is associated with the third data 13 through a link B.

The first data 11 is displayed on a screen E, and the second data 12 is displayed on a screen J. As a result, the first data 11 and the second data 12 can be displayed in the comparison format.

When the link A of the first data 11 is called by referring to the screen E, the third data 13 is displayed on the screen E. Since the first data 11 and the third data 13 belong to the first data type, they match in data type on the screen E when the link information is requested on the screen E.

When the link B of the second data 12 is called on the screen J, the third data 13 is displayed on the screen J. The first data 11 belongs to the second data type and the third data 13 belongs to the first data type. Therefore, when the link information is requested on the screen J, the information of a different data type is alternately displayed on the screen J, and confuses the user. For example, if the first data 11 and the third data 13 are described in different languages, the user who cannot understand the language of the third data 13 displayed on the screen J is confused.

Therefore, when the link B of the second data 12 is called on the screen J, the third data 13 belonging to the data of the first data type is first converted into fourth data 14 belonging to the data of the second data type, and is then displayed on the screen J. As a result, the data can be displayed in the same data type on the screen J, and can protect the user against the inconvenience occurring when the link information is requested on the screen J.

Described below is the output control apparatus according to the present invention applied to a screen control apparatus.

FIG. 3 is a block diagram showing the configuration of the screen control apparatus according to the first embodiment of the present invention. According to the first embodiment of the present invention, when hyper-document data is processed on a plurality of relevant screens (windows, browsers, etc.), a user-friendly interface can be realized by controlling the type of displayed information (for example, languages) on each screen.

In FIG. 3, a display unit 21 is a CRT (Cathode Ray Tube display), a liquid crystal display, etc., and comprises screens E, J, K, . . . for displaying plural types of information. An input control unit 22 monitors the display formats of the screens E, J, K, . . . A process type determination unit 23 determines the process type of hyper-document data based on the display formats of the specified screens E, J, K, . . .

A process type definition file 24 stores the contents of the processed document data referred to by a hyperlink corresponding to a process type. A data obtaining unit 25 obtains document data referred to by a hyperlink. A external data unit 26 provides document data referred to by a hyperlink. A converting unit 27 comprises conversion devices 27a through 27c and performs a converting process depending on each process type. A conversion control unit 28 selects the conversion devices 27a through 27c depending on the contents of the process type definition file 24, and controls the conversion of the referred-to document data of the hyper document data. An output control unit 29 outputs the process result of the referred-to document data to the specified screens E, J, K, . . . .

For example, assume that a hyper-document is displayed in English on the screen E, in Japanese on the screen J, and in French on the screen K. Additionally, assume that a hyperlink of the hyper-document displayed on the screen E is also embedded in the hyper-document displayed on the screens J and K. If the hyperlink is referred to on the screen E, the document referred to by the hyperlink is displayed in English on the screen E.

When a hyperlink is referred to on the screen J, a hyper-document is displayed in Japanese on the screen J and the document referred to by the hyperlink is written in English. Therefore, it is determined that the language displayed on the screen J is different from the language of the referred-to document. As a result, the document referred to by the hyperlink is translated into Japanese to make the language displayed on the screen J match the language of the referred-to document for display on the screen J.

When a hyperlink is processed on the screen K, a hyper-document is displayed in French on the screen K and the document referred to by the hyperlink is written in English. Therefore, it is determined that the language displayed on the screen J is different from the language of the referred-to document. As a result, the document referred to by the hyperlink is translated into French to make the language displayed on the screen J match the language of the referred-to document for display on the screen J.

Thus, assume that a hyperlink in an English document is embedded as is in a Japanese document, and the document referred to by the hyperlink embedded in the Japanese document is written in English. In this case, the document referred to by the hyperlink can be displayed in Japanese on the screen J where the Japanese document is displayed. Consequently, a document can be prevented from being described in different languages alternately on the same screen.

FIG. 4 is a block diagram showing the configuration of the screen control apparatus according to the second embodiment of the present invention. The second embodiment improves the convenience in controlling a screen by adding various functions to the configuration of the screen control apparatus shown in FIG. 3.

In FIG. 4, an input unit 31 can be, for example, a keyboard, a mouse, a scanner, etc., selects one of the screens E, J, K, . . . of a display unit 32, scrolls the screens E, J, K, . . . , and calls a hyperlink displayed on the screens E, J, K, . . . The display unit 32 is provided with the screens E, J, K, . . . for displaying various types of information. An input control unit 33 constantly monitors a process instruction to be issued to any of the screens E, J, K, . . . A display state management table 33a manages the display state of the screens E, J, K, . . . for each document type.

A process type determination unit 34 searches a process type definition file 35 according to the screen information obtained from the display unit 32 and a process instruction obtained from the input unit 31, and determines the process type to be performed by a device. The process type definition file 35 stores a process correspondence table for the screen information and process instructions. A data obtaining unit 36 is activated when the process type determination unit 34 requires obtaining new data, and obtains the new data from an external data 37. The external data 37 is stored in an external storage device such as a hard disk, or is obtained from an external database through a communications line. A converting unit 38 is provided with a plurality of conversion devices 38a through 38c, and activates any of the conversion devices 38a through 38c required in a converting process. When it is determined that the external data 37 requires a converting process, a conversion control unit 39 controls the conversion of the external data 37 obtained by the data obtaining unit 36. A language type determination unit 39a determines the language type of document data by checking the ratio of the character types contained in the document data.

An output control unit 40 distributes the converted data based on the process type determined by the process type determination unit 34, and outputs the data on any of the screens E, J, K, . . . of the display unit 32. When the screens E, J, K, . . . do not correspond to the document type, the screen generation unit 40a generates new screens E, J, K, . . . When the document data referred to by a hyper-document data is displayed on any of the screens E, J, K, . . . , a screen synchronization control unit 40b instructs another screen of the screens E, J, K, . . . to display the conversion result of the referred-to document data in synchronism with the display of the referred-to document data. A display order control unit 40c controls the output order of the external data 37 based on the time required to obtain the external data 37 from the data obtaining unit 36. A character code correspondence table 41 regulates the character codes displayed on the screens E, J, K, . . . for each of the screens E, J, K, . . . A display order definition table 42 defines the priority in output order of the external data 37 corresponding to the time required to obtain the external data 37 by the data obtaining unit 36.

Figure 5:
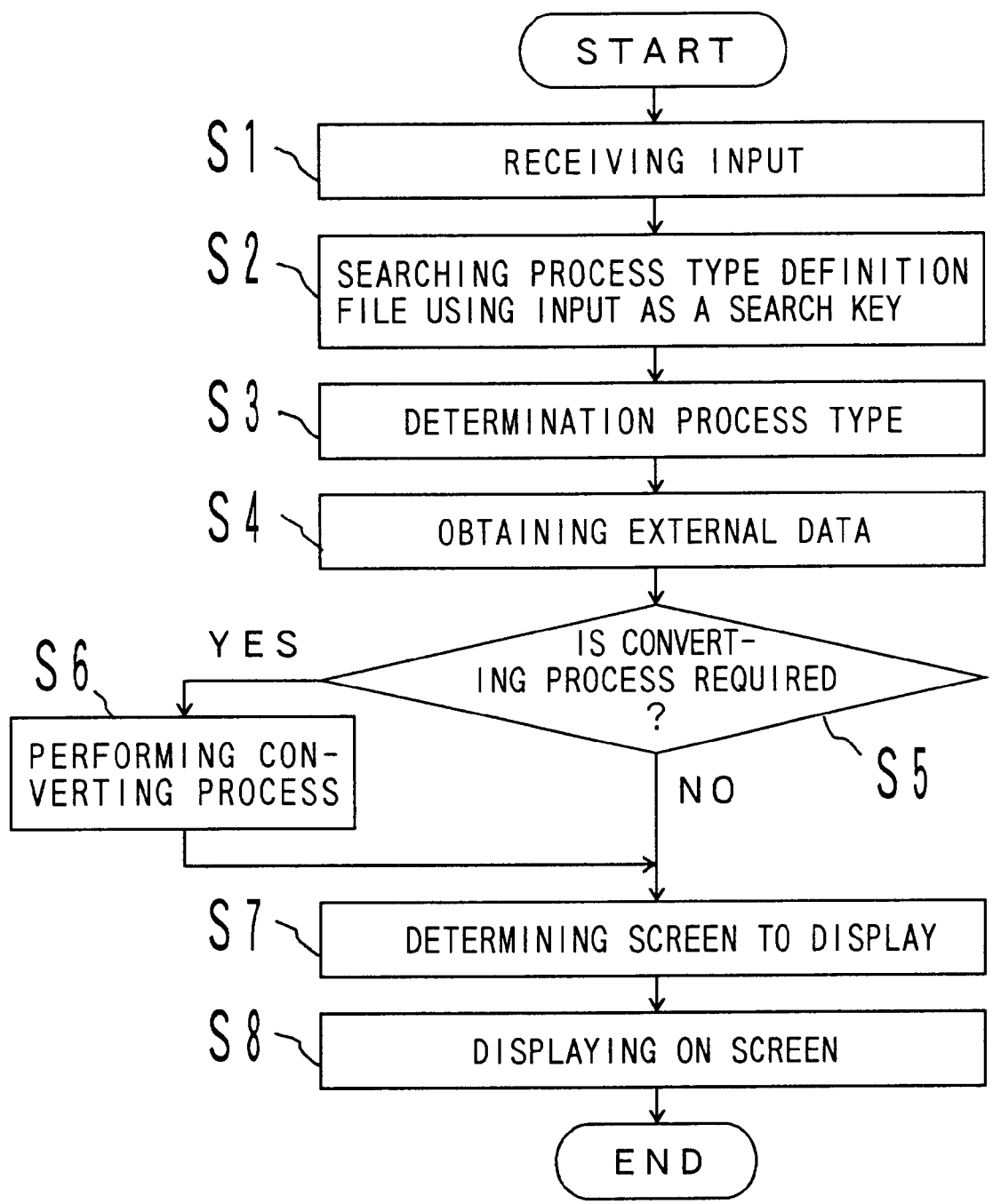
FIG. 5 is a flowchart showing the screen control process according to the first embodiment of the present invention.

FIG. 5 is a flowchart showing the screen control process according to the first embodiment of the present invention.

In FIG. 5, the input unit 31 receives an input from the operator (step S1).

Next, the process type determination unit 34 searches the process type definition file 35 using as a search key the input received by the input unit 31 and the display type on the screens E, J, K, . . . monitored by the input control unit 33 (step S2).

Then, the process type determination unit 34 determines the process type based on the search result of the process type definition file 35 (step S3).

The data obtaining unit 36 obtains the external data 37 based on the process type determined by the process type determination unit 34 (step S4).

Next, the conversion control unit 39 determines whether or not the external data 37 requires the converting process based on the process type (step S5). If the converting process is required, the conversion control unit 39 activates the conversion devices 38a through 38c corresponding to respective process types, and performs the converting process (step S6).

Then, the output control unit 40 determines the screens E, J, K, . . . for displaying the external data 37 obtained by the data obtaining unit 36 or the data converted by the converting unit 38 based on the display type on the screens E, J, K, . . . monitored by the input control unit 33 (step S7).

The output control unit 40 outputs the external data 37 obtained by the data obtaining unit 36, or the data converted by the converting unit 38 to the display unit 32, and displays the data on the screens E, J, K, . . . (step S8).

Figure 6:
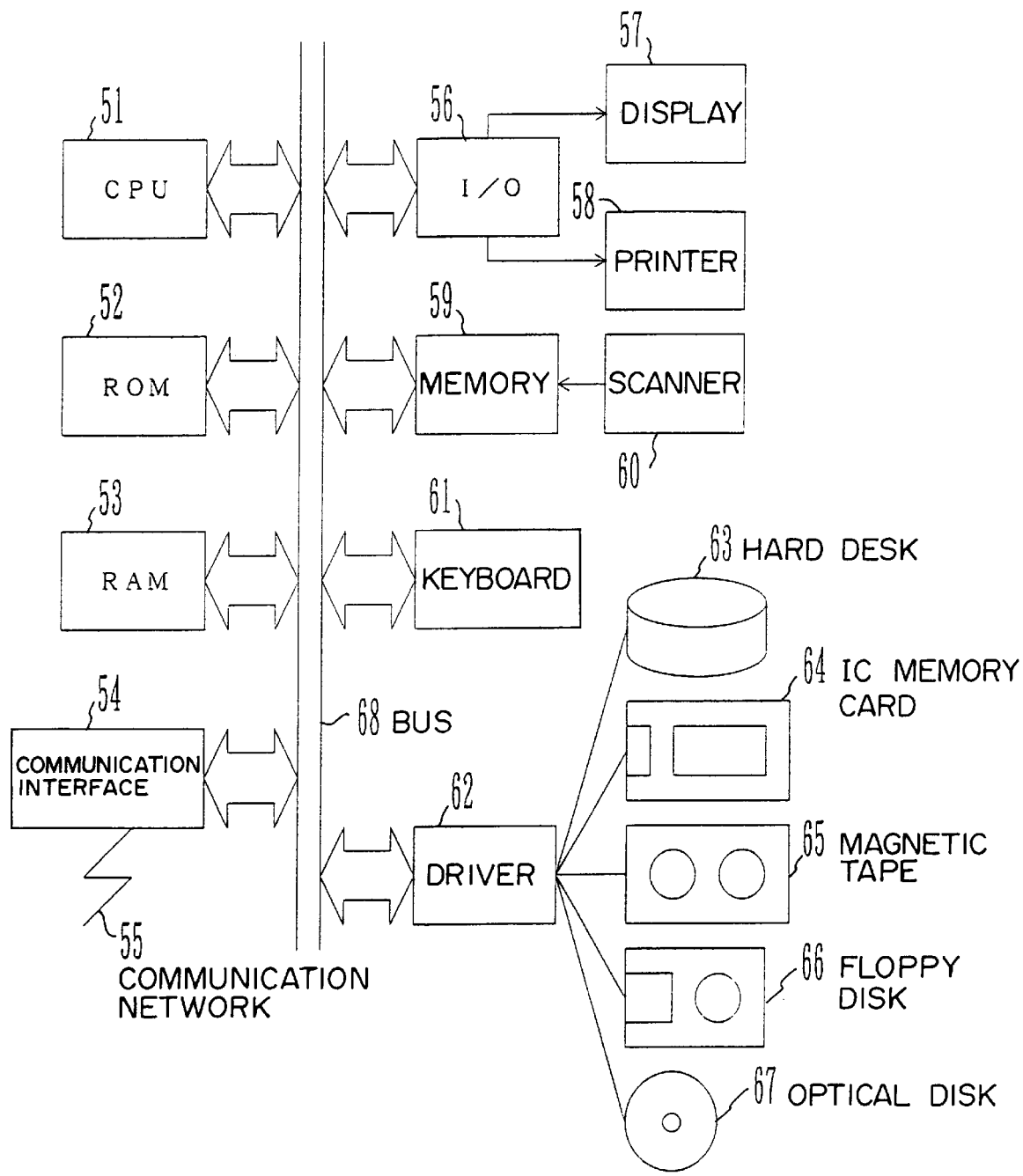
FIG. 6 is a block diagram showing the configuration of the system of the screen control apparatus according to an embodiment of the present invention.

FIG. 6 is a block diagram showing the configuration of the system of the screen control apparatus according to an embodiment of the present invention.

In FIG. 6, a central processing unit (CPU) 51 performs general processes. 52 is a read-only memory (ROM). 53 is a random access memory (RAM). 54 is a communications interface. 55 is a communications network. 56 is an input/output interface. A display 57 generates a plurality of display screens. A printer 58 prints a text, an image, etc. A memory 59 temporarily stores data read by a scanner 60. The scanner 60 reads a text, an image, etc. 61 is a keyboard. A driver 62 drives a storage medium. 63 is a hard disk. 64 is an IC memory card. 65 is a magnetic tape. 66 is a floppy disk. An optical disk 67 can be CD-ROM, DVD-ROM, etc. 68 is a bus.

A storage medium such as the hard disk 63, the IC memory card 64, the magnetic tape 65, the floppy disk 66, the optical disk 67, etc. stores a program for performing a screen control process, a translating process, etc., or hypermedia data, etc. The screen can be controlled by reading the program for performing a screen control process, a translating process, etc. from the above described storage media to the RAM 53. Furthermore, the program for performing a screen control process, a translating process, etc., or hypermedia data, etc. can be stored in the ROM 52.

The program for performing a screen control process, a translating process, etc., or hypermedia data, etc. can be retrieved from the communications network 55 through the communications interface 54. A LAN (Local Area Network), a WAN (Wide Area Network), the Internet, an analog telephone network, a digital telephone network (ISDN; Integral Service Digital Network), a wireless communications network such as a PHS (Personal Handyphone System), satellite communications, etc. can be used as a communications network 55 connected to the communications interface 54.

When a program for performing a screen control process is activated, the CPU 51 monitors the display state in the display 57. When a hyperlink displayed on the display 57 is called, the document data referred to by the hyperlink is obtained. If the document data referred to by the hyperlink is described in English, then the document data can be displayed in English when the hyperlink is called on the display described in English. On the other hand, when the hyperlink is called on the display described in Japanese, a program for translating English into Japanese is activated, and the document data referred to by the hyperlink is translated into Japanese, and then displayed on the screen.

Described below further in detail is the operation of the screen control apparatus shown in FIG. 4. The following embodiment is described with the machine translation of English into Japanese given for easier explanation.

Figure 7:
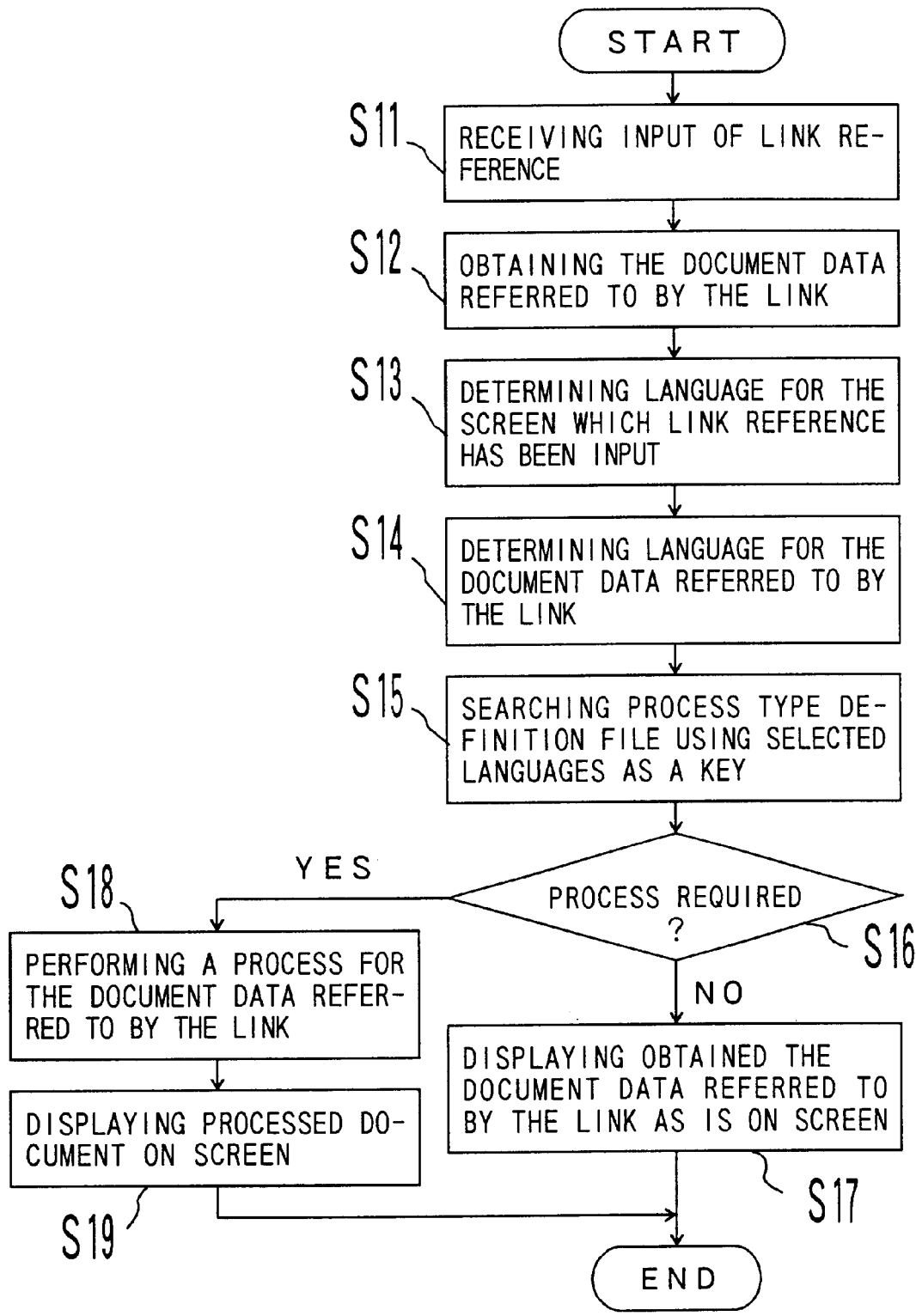
FIG. 7 is a flowchart showing the screen control process in machine translation.

FIG. 7 is a flowchart showing the screen control process in machine translation.

In FIG. 7, the input unit 31 receives an input of a link reference (step S11).

Next, the data obtaining unit 36 obtains the document data referred to by the link (step S12).

Then, the process type determination unit 34 determines the type of the language for the screens E, J, K, . . . on which the link reference has been input (step S13).

Then, the process type determination unit 34 determines the type of the language for the document referred to by the link (step S14).

The process type determination unit 34 then searches the process type definition file 35 using as a search key the type of the language for the screens E, J, K, . . . on which the link reference has been input and the type of the language of the document referred to by the link (step S15).

Then, the process type determination unit 34 determines whether or not the document data referred to by the link requires translation by referring to the process type definition file 35 (step S16). If no translation is required, then document data obtained by the data obtaining unit 36 is displayed as is on the screens E, J, K, . . . on which the link reference has been input (step S17).

When document data should be translated, the conversion devices 38a through 38c corresponding to the language type are activated, and the document data obtained by the data obtaining unit 36 are translated (step S18).

Then, the translated document data is displayed on the screens E, J, K, . . . on which the link reference has been input (step S19).

Figure 8:
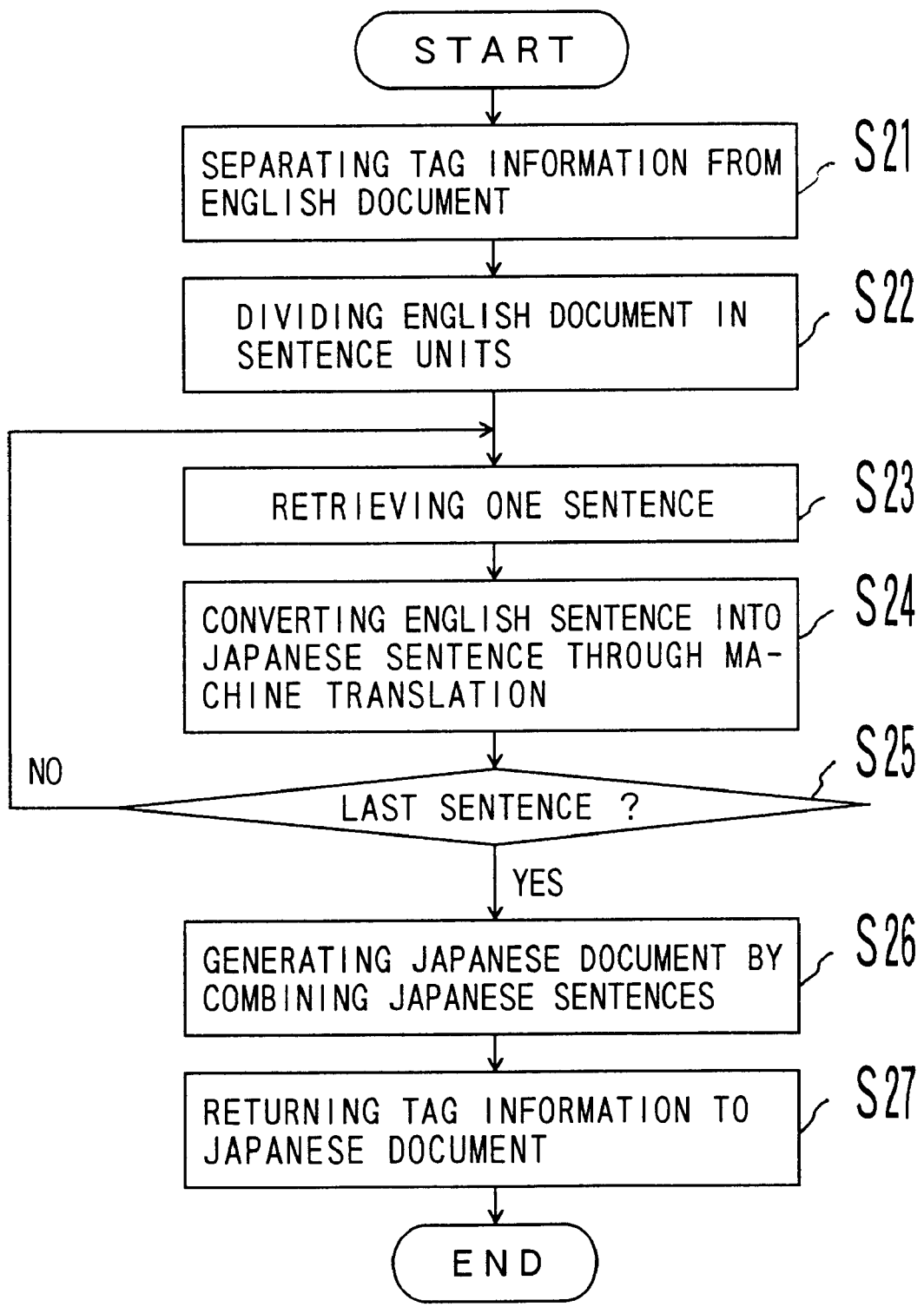
FIG. 8 is a flowchart showing the first embodiment of the converting process according to the present invention.

FIG. 8 is a flowchart showing the converting process according to the first embodiment of the present invention.

In the converting process according to the first embodiment of the present invention, a translation process is performed.

In FIG. 8, for example, the conversion device 27a separates the tag information from the English document (step S21), and divides the English document in sentence units (step S22).

Next, a sentence is retrieved from the English document (step S23), and the English sentence is machine-translated into a Japanese sentence (step S24). If the machine translation has been performed to the end of the last sentence in the English document (step S25), then the translated Japanese sentences are combined into a Japanese document (step S26) and the tag information is returned to the generated Japanese document (step S27).

Figure 9:
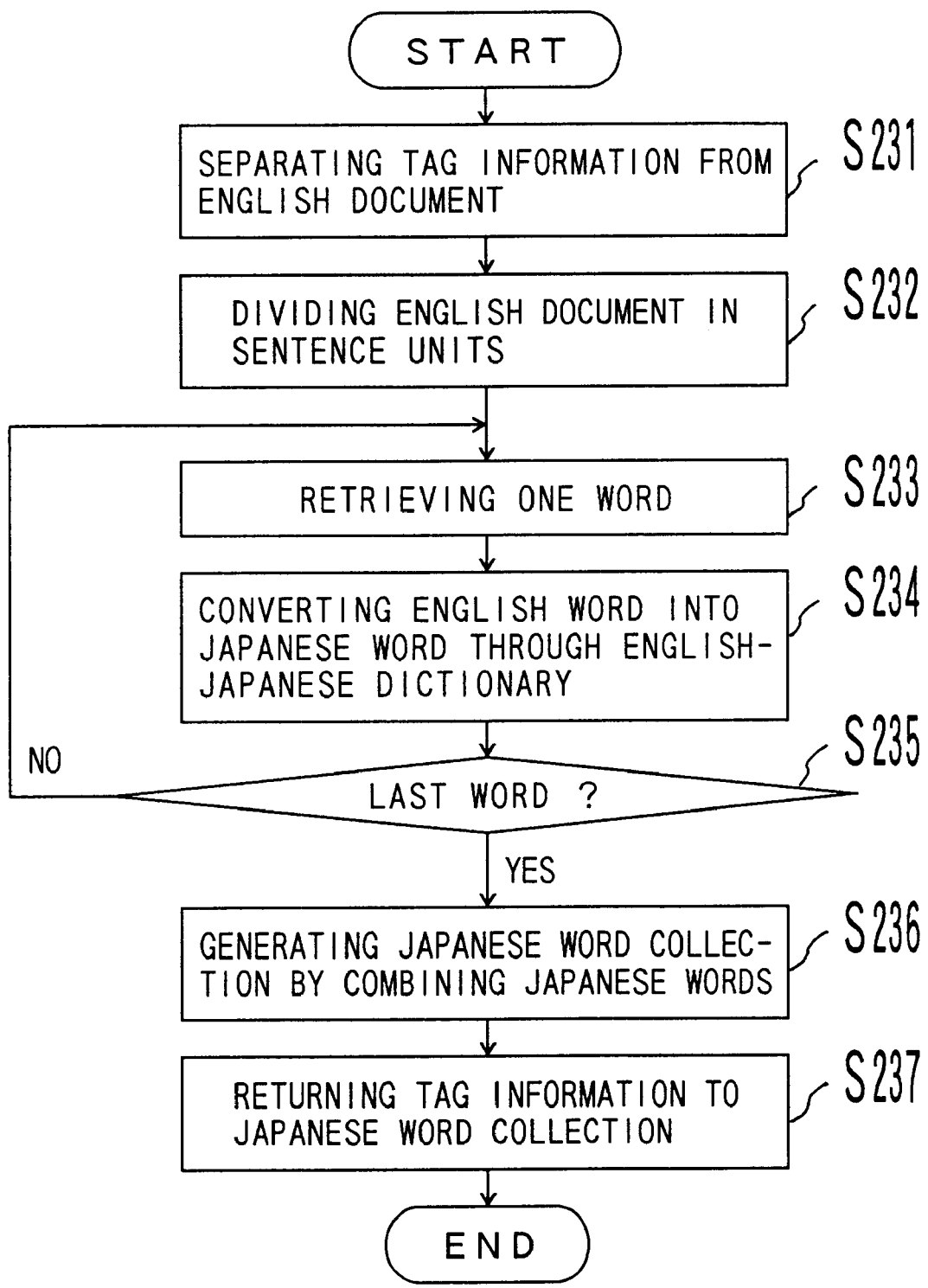
FIG. 9 is a flowchart showing the second embodiment of the converting process according to the present invention.

FIG. 9 is a flowchart showing the converting process according to the second embodiment of the present invention.

A dictionary searching process is performed in the converting process according to the second embodiment of the present invention.

In FIG. 9, for example, the conversion device 27b separates the tag information from the English document (step S231), and divides the English document in word units (step S232).

An English word is retrieved from the English document (step S233), and converts the English word into a Japanese word by searching an English-Japanese dictionary (step S234). If the English-Japanese word searching process has been performed to the end of the last word in the English document (step S235), then the Japanese words are combined into a Japanese word collection (step S236), and the tag information is returned to the generated Japanese word collection (step S237).

Figure 10:
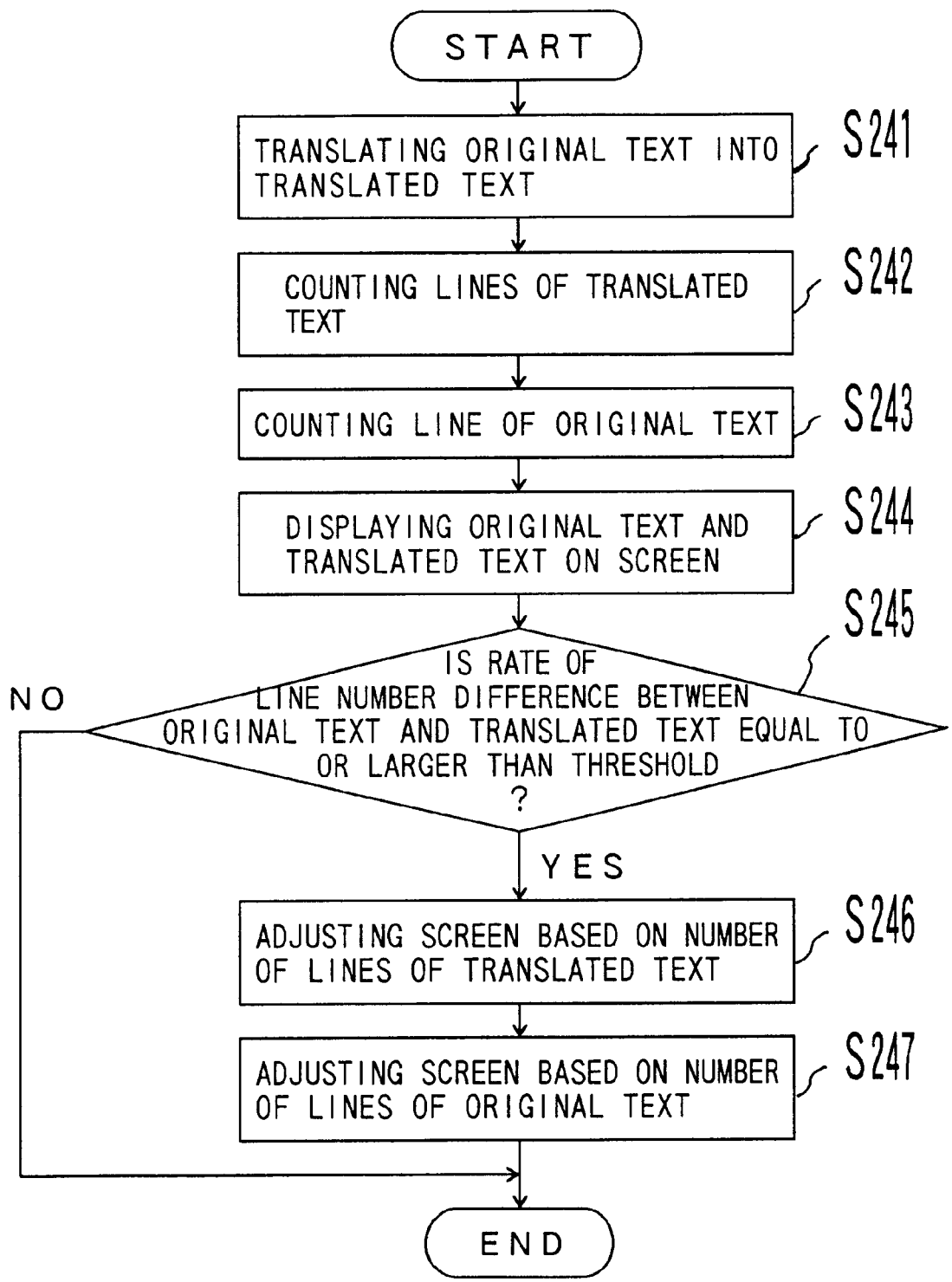
FIG. 10 is a flowchart showing the screen display control process according to an embodiment of the present invention.

FIG. 10 is a flowchart showing the screen display control process according to an embodiment of the present invention. According to the embodiment, the method of displaying the screen is controlled such that corresponding sentences or words between the original text and the translated text can be displayed at almost the same positions on the screens. For example, when Japanese is translated into English, the length of the English sentence is normally 1.2 through 2 times longer than that of the Japanese sentence. Therefore, when a Japanese document and an English document are displayed on the screens of the same size in the in the bilingual format, the corresponding sentences or words may be displayed at different positions. This problem should be solved in such a way that a Japanese document and an English document can be efficiently displayed in the bilingual format.

In FIG. 10, the output control unit 40 obtains translated text from the original text (step S241).

Then, the output control unit 40 computes the number of lines of the translated text (step S242), computes the number of lines of the original text (step S243), and displays the original text and the translated text on the screens E, J, K, ... (step S244).

When the rate of the difference between the number of lines of the original text and the number of lines of the translated text is equal to or larger than a predetermined threshold (step S245), the output control unit 40 adjusts the screens E, J, K, ... based on the number of lines of the translated text (step S246), and adjusts the screens E, J, K, ... based on the number of lines of the original text (step S247). For example, when the rate of the difference between the number of lines of the original text and the number of lines of the translated text exceeds 0.3, the size of the screens should be adjusted.

In addition to the method of counting the number of lines of original text and translated text, the volumes of the original text and the translated text can be computed by counting the number of characters contained in each text.

To adjust the screens, for example, the character size, character spacing, line spacing, or line feed position can be controlled. For example, when the volume of original text is larger than the volume of translated text, the character size, character spacing, line spacing, or number of lines of the original text is set to a smaller value than the character size, character spacing, line spacing, or number of lines of the translated text for display on the screens E, J, K, .....

When the volume of original text is larger than the volume of translated text, the screens E, J, K, ... for displaying the original text can be set larger in width than the screens E, J, K, ... for displaying the translated text. For example, if a Japanese document is translated into an English document, and the English document is double the volume of the Japanese document, then the screens E, J, K, ... for displaying the English document is set double in width the screens E, J, K, ... for displaying the Japanese text. Thus, the lines of the Japanese document and the English document to be displayed in the bilingual format can be located at the same positions.

Described below in detail is the operation of the screen control apparatus shown in FIG. 4 by referring to the method of displaying data on the screen in the English-Japanese bilingual format. In the following embodiments, it is assumed that the document referred to by a hyperlink is written in English.

FIG. 11A shows an example of displaying a document in the English-Japanese bilingual format.

In FIG. 11A, the screen E and the screen J are arranged adjacently on the left and right. English data is displayed on the screen E. For example, 'There is a book on the table. And there are pens on the floor.' is a document 1E displayed on the screen E. Japanese data is displayed on the screen J. As an English-Japanese translation result, the Japanese document 1J 'テーブルの上に本があります。また、床にはペンがあります。' is displayed on the screen J.

The document 1E contains a hyperlink 71 to the document 2E. The hyperlink 71 is displayed with diagonal lines at the position of the 'pens'of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Therefore, a hyperlink 72 to the document 2E is displayed with diagonal lines at the position of the 'ペン' in the document 1J. The screens E and J can be realized by windows and browsers in a window system.

With the settings of the screens, the operator can process the hyperlink 72 by clicking the mouse button with the hyperlink 72 pointed to on the screen J. The data obtaining unit 36 retrieves the document 2E from the external data 37.

FIG. 11B shows an example of the contents of the document 2E referred to by the hyperlink 72.

In FIG. 11B, the document 2E reads 'It's a fine day today.' in English. The document 2E is called on the screen J which displays data written in Japanese. As shown in FIG. 11B, the contents of the document 2E written in English is translated into Japanese to obtain the document 2J. The contents of the document 2J reads '今日は良い天気です。'.

FIG. 11C shows the first example of displaying the English-Japanese translation result of the referred-to document.

In FIG. 1C, the output control unit 40 receives from the conversion control unit 39 the contents of the document 2J to be output, receives from the process type determination unit 34 the information that the screen to be output is the screen J, and displays the contents of the document 2J on the screen J. As a result, the screen J displays '今日は良い天気です。' in Japanese.

As described above, even if the English document 2E is referred to on the screen J, the Japanese text can be displayed on the screen J, thereby preventing a document from being displayed alternately in English and Japanese on the screen J.

FIG. 12A shows an example of the contents of the information input when the hyperlink 72 is called on the screen J. The input information is obtained by clicking the mouse button with the hyperlink 72 pointed to on the screen J.

In FIG. 12A, the input information contains the name of the input screen and the name of the document referred to by the hyperlink. For example, when the hyperlink 72 is called on the screen J, the name of the input screen is 'the screen J', and the name of the referred-to document is 'the document 2E' according to the present embodiment. The input information is transmitted to the process type determination unit 34. The process type determination unit 34 searches the process type definition file 35 according to the input information, and obtains the type of the process to be performed on the document 2E.

FIG. 12B shows an example of the contents of the process type definition file 35.

In FIG. 12B, a converting process to be performed on the language of a referred-to document and the language displayed on the input screen is described in the process type definition file 35. For example, if the language of a referred-to document is English and the language displayed on the input screen is Japanese, then English-Japanese translation is specified as a converting process. If the language of a referred-to document is English and the language displayed on the input screen is English, then no translation is specified as a converting process. If the language of a referred-to document is Japanese and the language displayed on the input screen is English, then Japanese-English translation is specified as a converting process. If the language of a referred-to document is Japanese and the language displayed on the input screen is Japanese, then no translation is specified as a converting process.

Assume that the input information shown in FIG. 12A is given. Since the language displayed on the screen J is Japanese and the language of the document 2E is English, the English-Japanese translation is retrieved from the process type definition file 35 when the referred-to language is English and the input screen language is Japanese. Based on the retrieval result from the process type definition file 35, process type information is generated to process the document 2E.

FIG. 12C shows the first example of the contents of the process type information.

In FIG. 12C, the process type is obtained as 'obtaining the document 2E referred to by the hyperlink 72 by accessing the external database' according to the information that the referred-to document in FIG. 12A is the document 2E. Furthermore, as a retrieval result from the process type definition file 35, the process type is obtained as 'obtaining the document 2J by translating into Japanese the document 2E obtained by referring the hyperlink 72'. Additionally, according to the information that the input screen shown in FIG. 12A is the screen J, the process type of 'displaying the document 2J on the screen J' is also obtained.

According to the process type of 'accessing the external database and obtaining the document 2E referred to by the hyperlink 72', the data obtaining unit 36 obtains the data in the document 2E from the external data 37. The conversion control unit 39 instructs the converting unit 38 to perform the English-Japanese translation on the document 2E based on the process type of 'obtaining the document 2J by translating into Japanese the document 2E obtained by processing the hyperlink 72'. The output control unit displays the document 2J on the screen E of the display unit 32 based on the process type of 'displaying the document 2J on the screen J'. As a result, the document is displayed as shown in FIG. 11c.

Figure 13:
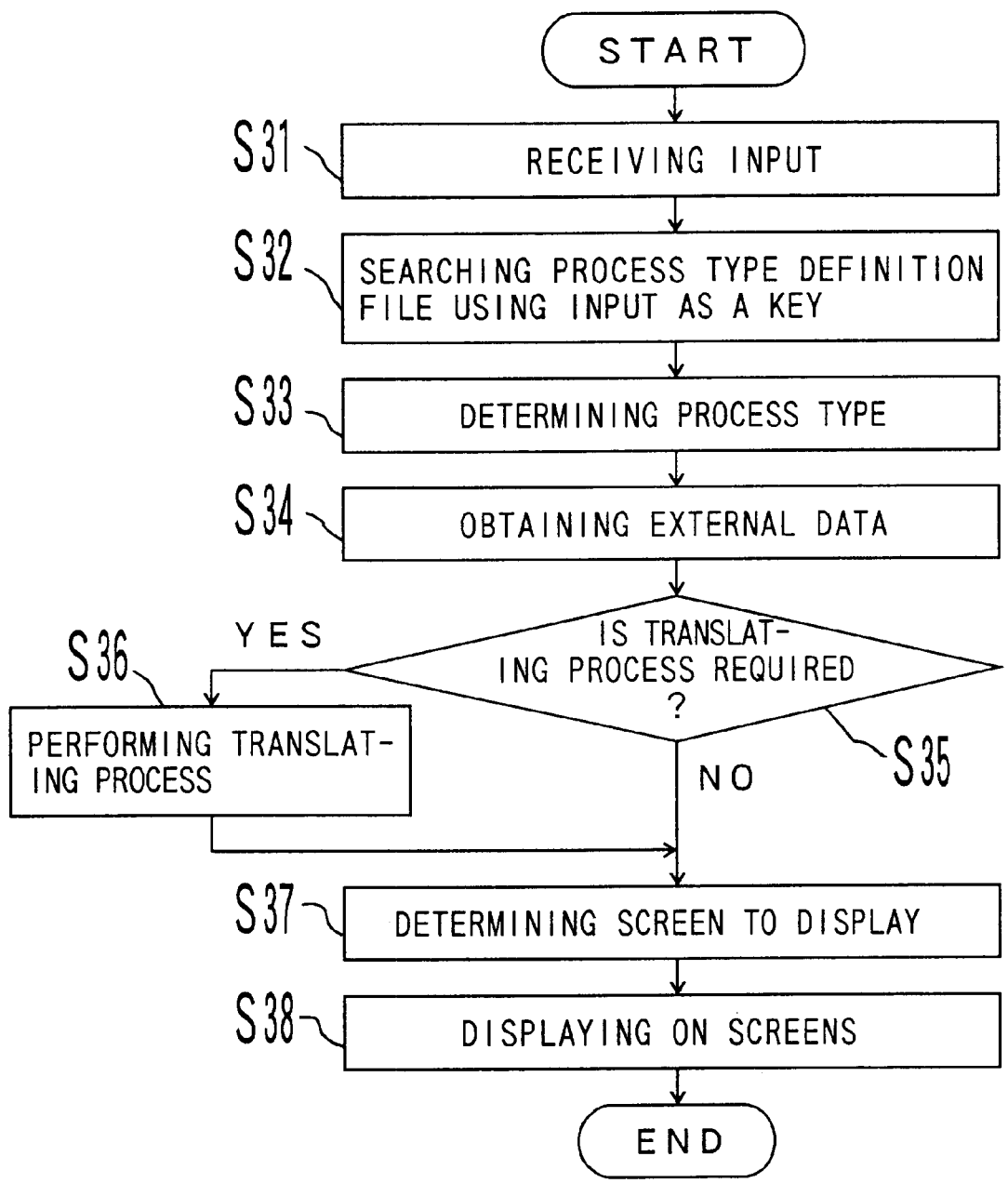
FIG. 13 is a flowchart showing the screen control process according to the second embodiment of the present invention.

FIG. 13 is a flowchart showing the screen control process according to the second embodiment of the present invention.

In FIG. 13, the input unit 31 receives an input from the operator (step S31).

Then, the process type determination unit 34 searches the process type definition file 35 using as a search key the language type of the referred-to document received by the input unit 31 and the language type of the screens E, J, K, . . . monitored by the input control unit 33 (step S32).

Next, the process type determination unit 34 determines the process type based on the search result of the process type definition file 35 (step S33).

Then, the data obtaining unit 36 obtains the external data 37 based on the process type determined by the process type determination unit 34 (step S34).

The conversion control unit 39 determines whether or not the translating process is required for the obtained external data 37 depending on the process type (step S35). If the translating process is required, the conversion devices 38a through 38c are activated depending on the process type for an appropriate translating process (step S36).

Next, the output control unit 40 determines the screens E, J, K, . . . displaying the external data 37 obtained by the data obtaining unit 36 or the data converted by the converting unit 38 depending on the language type on the screens E, J, K, . . . monitored by the input control unit 33 (step S37).

Then, the output control unit 40 outputs to the display unit 32 the external data 37 obtained by the data obtaining unit 36 or the data converted by the converting unit 38, and displays the data on the screens E, J, K, . . . (step S38).

Described below is the second example of displaying an English-Japanese bilingual document.

Figure 14A:
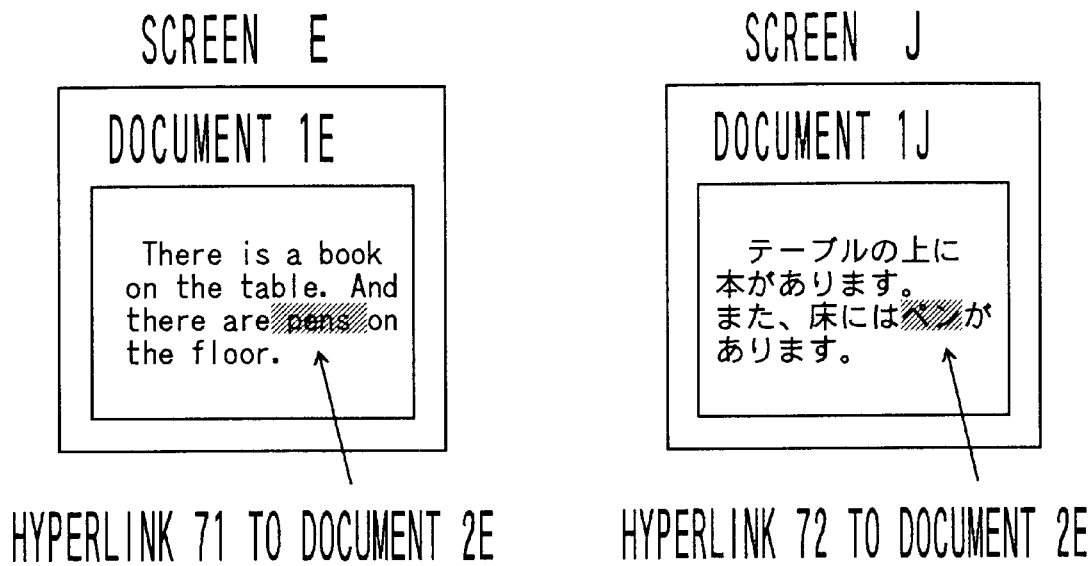
FIG. 14A shows an example of displaying an English-Japanese bilingual document.

FIG. 14A shows an example of displaying an English-Japanese bilingual document.

The example of displaying an English-Japanese bilingual document shown in FIG. 14A is the same as the example of displaying an English-Japanese bilingual document shown in FIG. 11A. The hyperlinks 71 and 72 shown in FIG. 14A also refer to the document 2E shown in FIG. 11B.

With the settings of the screen shown in FIG. 14A, the operator can process the hyperlink 72 of the document 1J by clicking the mouse button with the hyperlink 72 pointed to on the screen J. In this case, the input information is the same as that shown in FIG. 12A. Therefore, the English-Japanese translation is retrieved from the process type definition file 35 as a converting process. Based on the retrieval result from the process type definition file 35, the process type information is generated to process the document 2E.

Figure 14B:
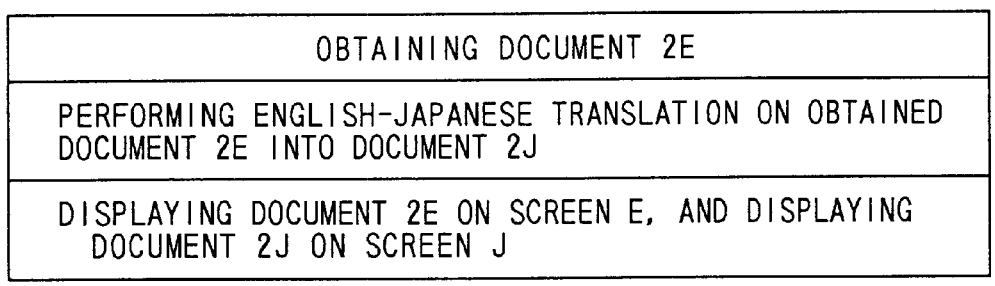
FIG. 14B shows the second example of the contents of the process type information.

FIG. 14B shows the second example of the contents of the process type information.

According to the information that the referred-to document is the document 2E, the process type of 'obtaining the document 2E referred to by the hyperlink 72 by accessing an external database' is obtained. Furthermore, based on the retrieval result from the process type definition file 35, the process type of 'obtaining the document 2J by translating into Japanese the document 2E obtained by referring to the hyperlink 72' is obtained. Additionally, according to the information that the input screen shown in FIG. 12A is the screen J, the process type of 'displaying the document 2J on the screen J' can also be obtained.

Added here is the condition that the contents displayed on the screen E and the screen J correspond to each other. As a result, the contents of the document 2J correspond to the contents of the document 2E. Since document 2E is written in English, the process type of 'displaying the document 2E on the screen E' can also be obtained.

Figure 14C:
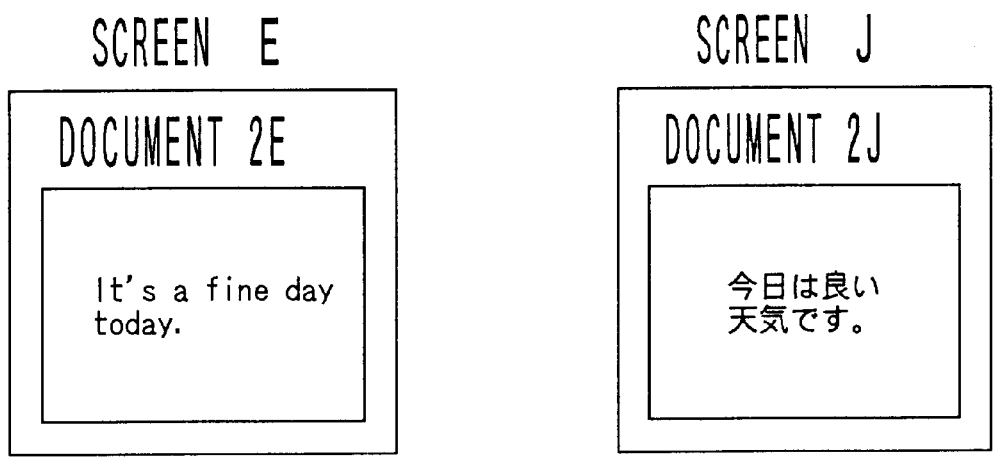
FIG. 14C shows the second example of displaying the English-Japanese translation result of the referred-to document.

FIG. 14C shows the second example of displaying the English-Japanese conversion result of the referred-to document.

In FIG. 14C, the output control unit 40 displays the contents of the document 2E on the screen E based on the process type of 'displaying the document 2E on the screen E'. As a result, the English description 'It's a fine day today.' is displayed on the screen E. The output control unit 40 activates the screen synchronization control unit 40b based on the process type of 'displaying the document 2J on the screen J', and displays the contents of the document 2J on the screen J. As a result, the Japanese description '今日は良い天気です。' is displayed on the screen J.

Thus, referred-to documents can be specified on the screen E as well as on the screen J by providing the screen synchronization control unit 40b, displaying the data on the screens E and J, and clicking the hyperlink 72 on the screen J. Therefore, the contents displayed on the screens E and J can be controlled to match each other.

Described below is the screen control process according to the third embodiment of the present invention.

In the third embodiment of the present invention, the type of the document referred to by a hyperlink is automatically determined to control the screens. The method of controlling the English-Japanese bilingual screen to be followed when it is not guaranteed that the document referred to by a hyperlink is an English document, or when it is not determined whether the document is written in English or Japanese.

FIG. 15 shows the method of determining a language type according to an embodiment of the present invention.

In FIG. 15 the language type determination unit 39a receives a character string in the document data obtained by the data obtaining unit 36, and outputs the language type of the document data. For example, when the sentence 'This is a pen.' is input to the language type determination unit 39a, 'English' is output as a language type determination result. When the sentence 'これはペンです。' is input to the language type determination unit 39a, 'Japanese' is output as a language type determination result.

As described above, when object languages are only English and Japanese, the language type can be determined by the ratio of the number of 1-byte characters to the number of 2-byte characters contained in a character string. That is, if the content of two-byte characters in a document data is equal to or higher than 20%, it is determined that the document data is written in Japanese. If the content is lower than 20%, it is determined that the document data is written in English. If two languages cannot be recognized by character codes, the language type of a document can be determined by searching the dictionary.

Thus, the uniqueness of the document type displayed on the screen can be specified by providing the language type determination unit 39a even if a document of a different type is referred to by a hyperlink.

Figure 16:
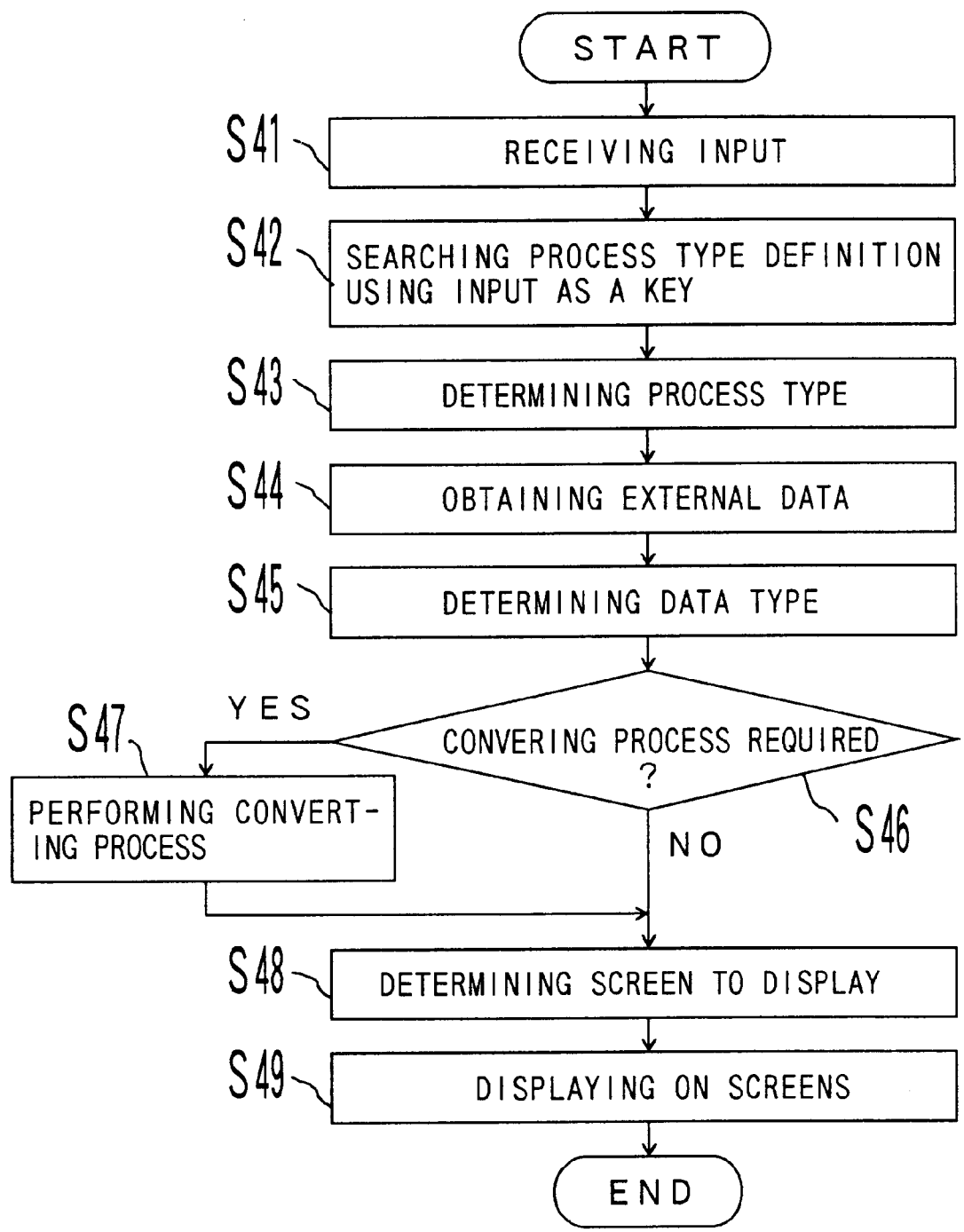
FIG. 16 is a flowchart showing the screen control process according to the third embodiment of the present invention.

FIG. 16 is a flowchart showing the screen controlling process according to the third embodiment of the present invention.

In FIG. 16, the input unit 31 receives an input from the operator (step S41).

The process type determination unit 34 searches the process type definition file 35 using as a search key the input received by the input unit 31 and the display type on the screens E, J, K, . . . monitored by the input control unit 33 (step S42).

Then, the process type determination unit 34 determines the process type based on the retrieval result from the process type definition file 35 (step S43).

The data obtaining unit 36 obtains the external data 37 based on the process type determined by the process type determination unit 34 (step S44).

Next, the language type determination unit 39a determines the data type of the external data 37 obtained by the data obtaining unit 36 (step S45).

The conversion control unit 39 searches the process type definition file 35 based on the data type determination result of the external data 37, and determines whether or not a converting process is required (step S46). If it is required, any of the conversion devices 38a through 38c is activated corresponding to the process type, and the data is converted (step S47).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S48).

The output control unit 40 outputs to the display unit 32 the external data 37 obtained by the data obtaining unit 36 or the data converted by the converting unit 38, and displays the output data on the screens E, J, K, . . . (step S49).

Described below is the screen control process according to the fourth embodiment of the present invention.

FIG. 17A shows an example of displaying an English document according to the fourth embodiment of the present invention.

In FIG. 17A, the screens E and J are generated adjacently on the right and left. The screen E displays data written in English. For example, the document 1E containing the description 'There is a book on the table. And there are pens on the floor.' is displayed. The screen J displays data written in Japanese, but nothing is displayed on the screen J.

The document 1E contains the hyperlink 71 to the document 2E, and the hyperlink 71 is displayed with diagonal lines at the position of the 'pens' in the document 1E. The hyperlink 71 refers to the document 2E written in English.

With the settings of the screen, the operator can process the hyperlink 71 in the document 1E by clicking the mouse button with the hyperlink 71 pointed to on the screen E. Then, the data obtaining unit 36 retrieves the document 2E from the external data 37. Assuming that the processes of displaying the document 2E on the screen E and displaying the document 2J on the screen J are specified as process types. According to the present embodiment, the output control unit 40 refers to the display state management table 33a before executing the instruction from the process type determination unit 34. The display state management table 33a manages whether or not the screens E, J, K, . . . are displayed.

FIG. 17B shows an example of the contents of the display state management table 33a.

In FIG. 17B, the contents of the display state management table 33a are 'displaying' on the screen E, and 'not displaying' on the screen J. Therefore, in the current settings, the English document 1E is displayed on the screen E, and the Japanese document 1J is not displayed on the screen J. Since the document 1E is displayed on the screen E, the document 2E is displayed on the screen E. On the other hand, since the document 1J is not displayed on the screen J, the document 1J is first displayed, and then the document 2J is displayed on the screen J.

FIG. 17C shows an example of displaying an English-Japanese bilingual document.

In FIG. 17C, the document 1J is displayed on the screen J. That is, the document 1J describing 'テーブルの上に本があります。また、床にはペンがあります。' displayed on the screen J as the English-Japanese translation result from the document 1E.

Thus, the English-Japanese bilingual display can be displayed as the referred-from text and the referred-to text by displaying the document 1J first, and then the document 2J on the screen J.

Figure 18:
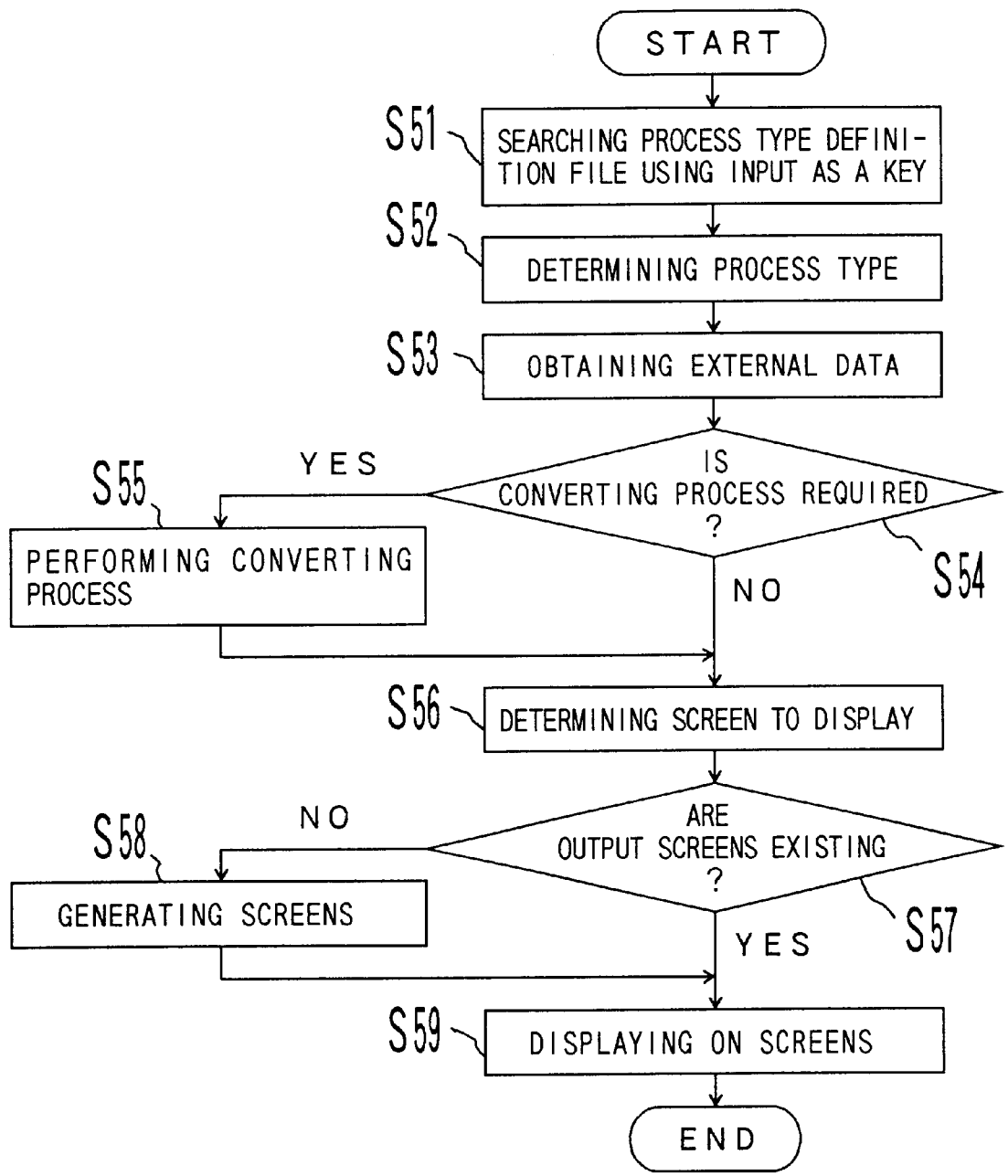
FIG. 18 is a flowchart showing the screen control process according to the fourth embodiment of the present invention.

FIG. 18 is a flowchart showing the screen control process according to the fourth embodiment of the present invention.

In FIG. 18, the process type determination unit 34 searches the process type definition file 35 using as a search key the input received by the input unit 31 and the display type on the screens E, J, K, . . . monitored by the input control unit 33 (step S51).

Then, the process type determination unit 34 determines the process type based on the retrieval result from the process type definition file 35 (step S52).

The data obtaining unit 36 obtains the external data 37 based on the process type determined by the process type determination unit 34 (step S53).

Then, the conversion control unit 39 determines based on the process type whether or not a converting process is required on the obtained external data 37 (step S54). When it is required, any of the conversion devices 38a through 38c corresponding to the process type is activated, and the conversion process is performed (step S55).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S56).

Based on the contents of the display state management table 33a, the output control unit 40 determines whether or not the output screens E, J, K, . . . exist (step S57). When the output screens E, J, K, . . . do not exist, the output control unit 40 activates the screen generation unit 40a and generates new screens E, J, K, . . . (step S58).

Then, the output control unit 40 outputs to the display unit 32 the external data 37 obtained by the data obtaining unit 36 or the data converted by the converting unit 38, and displays the output data on the screens E, J, K, . . . (step S59).

Described below is the screen control process according to the fifth embodiment of the present invention.

According to the fifth embodiment of the present invention, the display order of document data can be controlled on the screens E, J, K, . . . by providing the display order control unit 40c. For example, as a result of referring to the hyperlink 72 shown in FIG. 14A, the document 2E and the document 2J shown in FIG. 14C can be displayed. Assume that it is necessary to obtain the external data 37 through an external high-speed circuit in order to display the document 2E on the screen E, and that it is necessary to perform English-Japanese translation to obtain the document 2J. In this case, the output order of the document 2E and the document 2J is determined by referring to the display order definition table 42.

FIG. 19 shows an example of the contents of the display order definition table 42 according to an embodiment of the present invention.

In FIG. 19, the contents of the process can be obtaining data from the cache memory; obtaining data from the hard disk; obtaining external data through a high-speed line; obtaining data from the cache memory+machine translation process; and obtaining external data through a telephone line. In these processes, a higher priority is assigned to a process requiring a shorter process time. As a result, the first priority is assigned to obtaining data from the cache memory; the second priority is assigned to obtaining data from the hard disk; the third priority is assigned to obtaining external data through a high-speed circuit; the fourth priority is assigned to obtaining data from the cache memory+ machine translation process; and the fifth priority is assigned to obtaining external data through a telephone line.

From the contents of the display order definition table 42, the contents of the document 2E are obtained by the third priority, and the document 2J is generated by the fourth priority. Therefore, the contents of the document 2E are obtained by higher priority than the document 2J is generated. Consequently, the output control unit 40 outputs the document 2E to the display unit 32 by higher priority than to the document 2J.

When the contents of the document 2E are obtained through a telephone line, the contents of the document 2E are obtained by lower priority than the document 2J is generated. Thus, the document 2J is output by higher priority than the document 2E is output.

Figure 20:
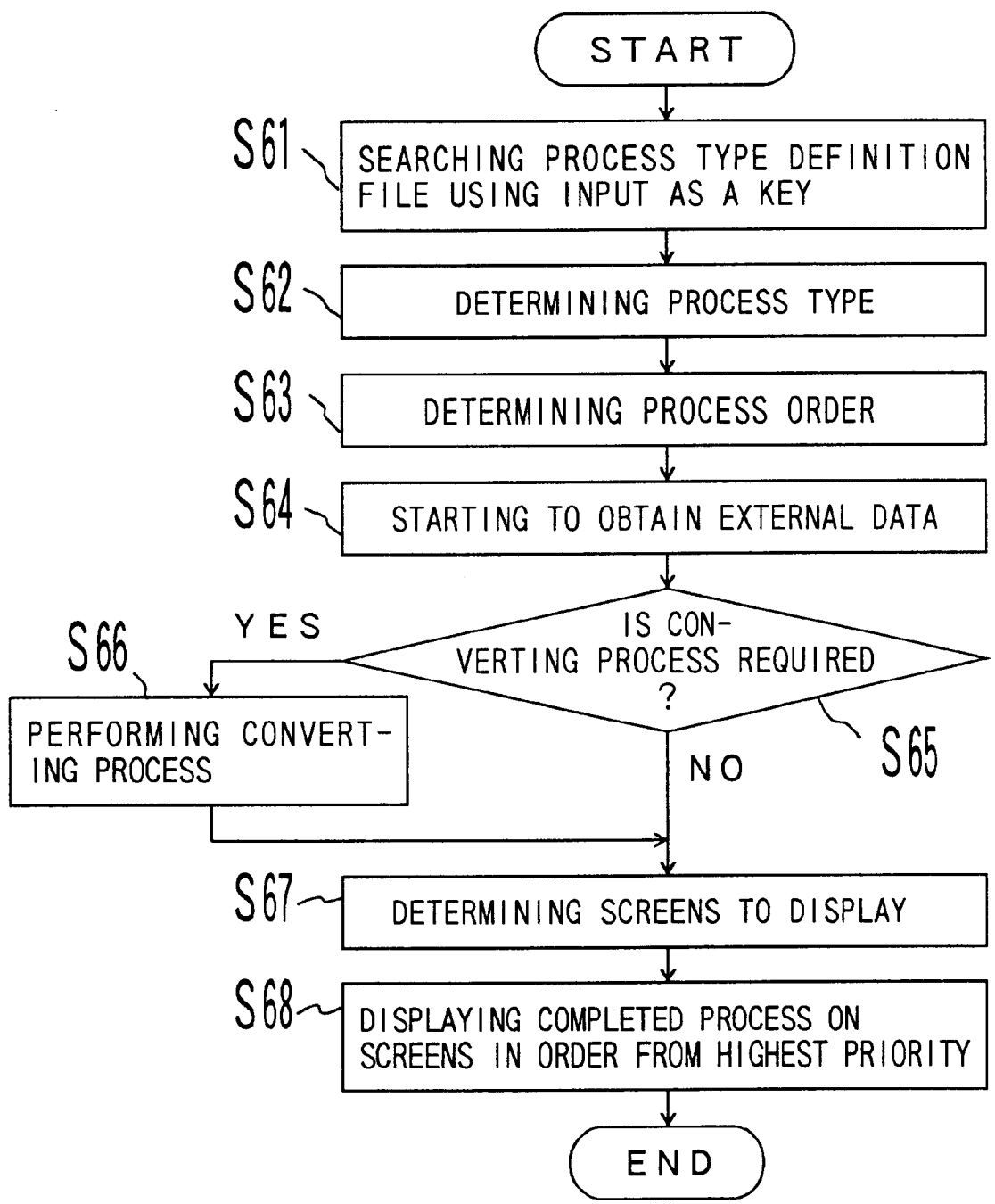
FIG. 20 is a flowchart showing the screen control process according to the fifth embodiment of the present invention.

FIG. 20 is a flowchart showing the screen control process according to the fifth embodiment of the present invention.

In FIG. 20, the process type determination unit 34 searches the process type definition file 35 using as a search key the input received by the input unit 31 and the display type on the screens E, J, K, . . . monitored by the input control unit 33 (step S61).

Then, the process type determination unit 34 determines the process type based on the retrieval result from the process type definition file 35 (step S62).

Next, the process type determination unit 34 determines the process order based on the contents of the display order definition table 42 (step S63).

The data obtaining unit 36 starts obtaining the external data 37 based on the process type determined by the process type determination unit 34 (step S64).

Then, the conversion control unit 39 determines based on the process type whether or not a converting process is required on the obtained external data 37 (step S65). When it is required, any of the conversion devices 38a through 38c corresponding to the process type is activated, and the conversion process is performed (step S66).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S67).

Then, the output control unit 40 outputs to the display unit 32 the external data 37 obtained by the data obtaining unit 36 or the data converted by the converting unit 38, and displays the output data on the screens E, J, K, . . . in order from the highest priority (step S68).

Described below is the screen control process according to the sixth embodiment of the present invention.

According to the sixth embodiment of the present invention, it is determined by referring to the display order definition table 42 whether or not obtaining data to be converted requires a long time. Then, the converting unit 27 performs a converting process. If it takes a long time to obtain data to be converted, then the converting process is started on a part of obtained data. For example, the data in the document 2E is externally obtained, and the English-Japanese machine translation is performed on the data of the document 2E to obtain the document 2J. Assuming that it takes a long time to obtain the data of the document 2E, the translating process is performed each time the contents of the document 2E are obtained in sentence units. Since the smallest unit in performing the translating process is a sentence, the translating process can be efficiently performed in sentence units without waiting for complete obtaining the entire document 2E. The translating operation can also be performed on a plurality of sentences such as 2 or 3 sentences.

Thus, the data of the document 2E can be obtained, and simultaneously the document 2E can be translated by starting the translating process on a part of the obtained data. Therefore, the translation of the document 2E can be started before the document 2E is completely obtained, thereby quickly outputting the translation result of the document 2E.

Figure 21:
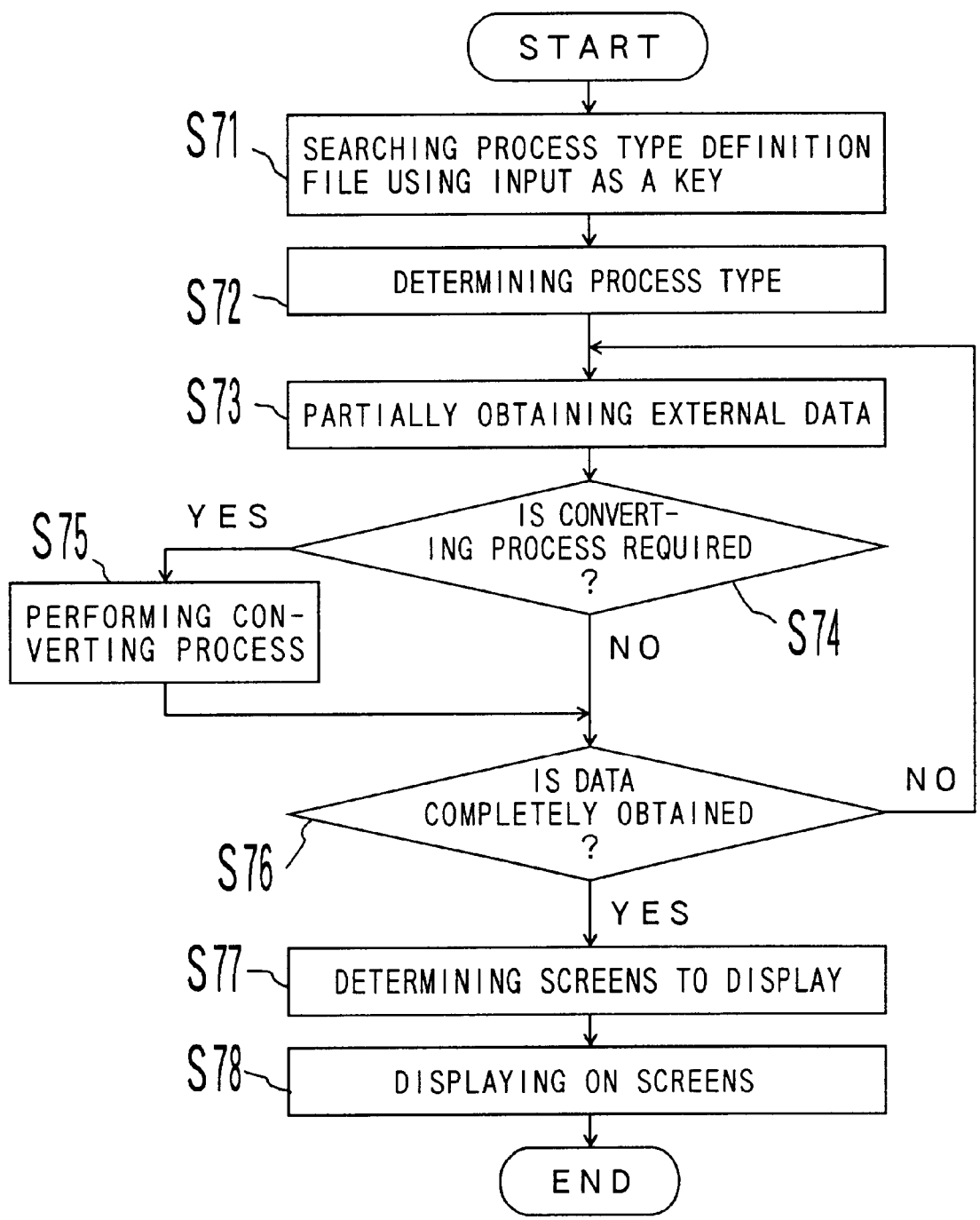
FIG. 21 is a flowchart showing the screen control process according to the sixth embodiment of the present invention.

FIG. 21 is a flowchart showing the screen control process according to the sixth embodiment of the present invention.

In FIG. 21, the process type determination unit 34 searches the process type definition file 35 using as a search key the input received by the input unit 31 and the display type on the screens E, J, K, . . . monitored by the input control unit 33 (step S71).

Then, the process type determination unit 34 determines the process type based on the retrieval result from the process type definition file 35 (step S72).

The data obtaining-unit 36 refers to the display order definition table 42. If it takes a long time to obtain the external data 37, the data should be divisionally obtained (step S73).

Then, the conversion control unit 39 determines based on the process type whether or not a converting process is required on the obtained external data 37 (step S74). When it is required, any of the conversion devices 38*a* through 38*c* corresponding to the process type is activated, and the conversion process is performed (step S75).

Then, it is determined whether or not the external data 37 has been completely obtained. If not, control is returned to step S73 to continue obtaining the external data 37 (step S76).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S77).

Then, the output control unit 40 outputs to the display unit 32 the external data 37 obtained by the data obtaining unit 36 or the data converted by the converting unit 38, and displays the output data on the screens E, J, K, . . . (step S78).

Described below is the screen control process according to the seventh embodiment of the present invention.

According to the seventh embodiment of the present invention, the screens E, J, K, . . . are provided for respective languages to be displayed as on the bilingual-format screen through machine translation. Additionally, the character code correspondence table 41 is provided. In the character code correspondence table 41, the character code is defined for each of the screens E, J, K, . . . Based on the character code correspondence table 41, the character code for opening each of the screens E, J, K, . . . can be automatically set.

FIG. 22 shows an example of the contents of the character code correspondence table 41 according to an embodiment of the present invention.

In FIG. 22, a character code is defined for each of the English screen E and the Japanese screen J in the character code correspondence table 41. For example, on the screen E, a Latin 1 type is defined as a character code. On the screen J, automatic identification for Japanese is defined as a character code. The output control unit 40 refers to the character code correspondence table 41. When the screen E is to be open, the character code is set as the Latin 1 type. When the screen J is to be open, the character code is set as the automatic identification for Japanese.

Figure 23:
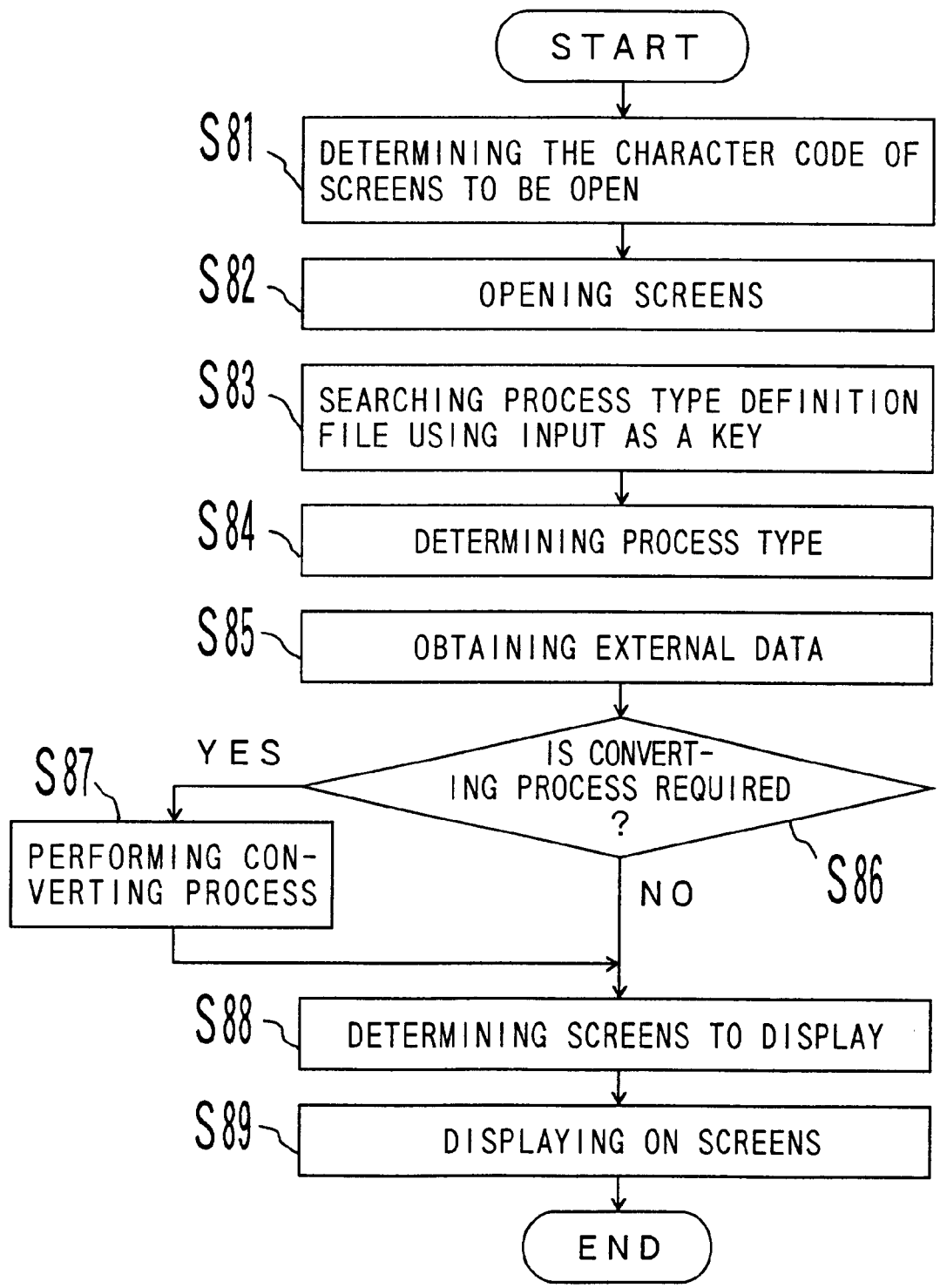
FIG. 23 is a flowchart showing the screen control process according to the seventh embodiment of the present invention.

FIG. 23 is a flowchart showing the screen control process according to the seventh embodiment of the present invention.

In FIG. 23, the output control unit 40 determines the character code of the screens E, J, K, . . . to be open by referring to the character code correspondence table 41 (step S81), and then opens the screens E, J, K, . . . (step S82).

Next, the process type determination unit 34 searches the process type definition file 35 using as a search key the input received by the input unit 31 and the display type on the screens E, J, K, . . . monitored by the input control unit 33 (step S83).

Then, the process type determination unit 34 determines the process type based on the retrieval result from the process type definition file 35 (step S84).

The data obtaining unit 36 obtains the external data 37 based on the process type determined by the process type determination unit 34 (step S85).

Then, the conversion control unit 39 determines based on the process type whether or not a converting process is required on the obtained external data 37 (step S86). When it is required, any of the conversion devices 38*a* through 38*c* corresponding to the process type is activated, and the conversion process is performed (step S87).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S88).

Then, the output control unit 40 outputs to the display unit 32 the external data 37 obtained by the data obtaining unit 36 or the data converted by the converting unit 38. Then the data is displayed on the screens E, J, K, . . . according to the character code defined in the character code correspondence table 41 (step S89).

Described below is the screen control process according to the eighth embodiment of the present invention. According to the eighth embodiment of the present invention, the screens E, J, K, . . . for displaying the English-Japanese bilingual document overlap each other. Therefore, when the hyperlink is hidden under any of the screens E, J, K, . . . , it should be made to be visible by adjusting the display positions on the screens E, J, K, . . . .

Figure 24A:
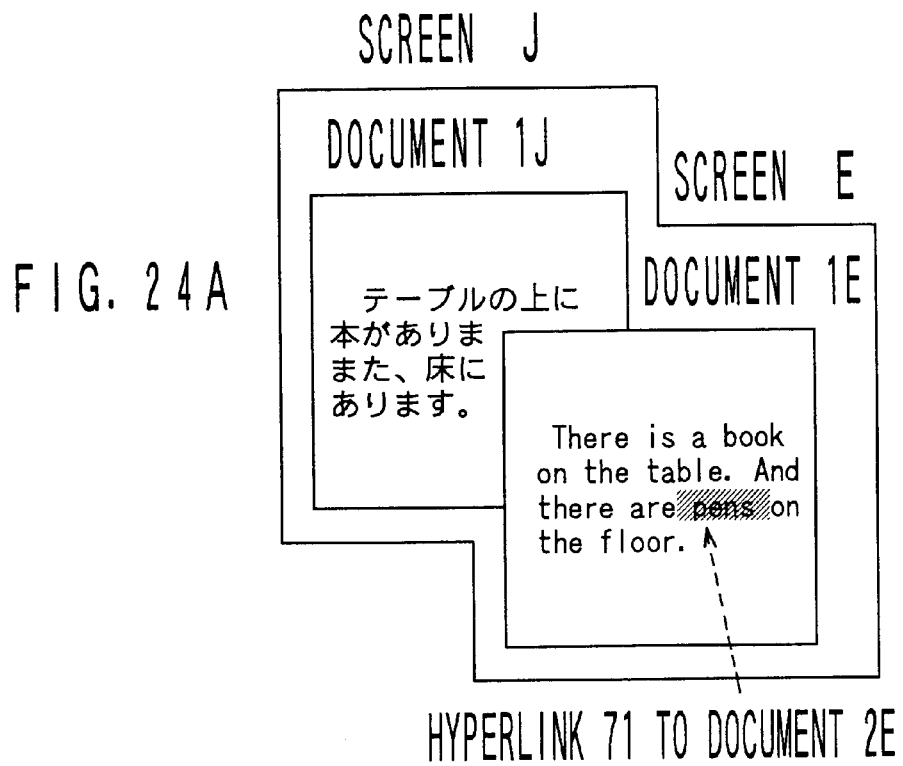
FIG. 24A shows an example of displaying the English-Japanese bilingual document before the display position of the document is adjusted.

FIG. 24A shows an example of displaying an English-Japanese bilingual document before adjusting the display position of the document.

In FIG. 24A, the screen E is generated as overlapping the screen J. That is, a part of the screen J is hidden under the screen E. English data is displayed on the screen E. For example, 'There is a book on the table. And there are pens on the floor.' is a document 1E displayed on the screen E. Japanese data is displayed on the screen J. As an English-Japanese translation result, the Japanese document 1J 'テーブルの上に本があります。また、床にはペンがあります。' is displayed on the screen J. Since the document 1E overlaps the document 1J, a part of the contents of the document 1J is not visible. The document 1E contains a hyperlink 71 to the document 2E. The hyperlink 71 is displayed with diagonal lines at the position of the 'pens' of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Since a part of the document 1J is hidden under the document 2E, the hyperlink 72 displayed at the position of the 'pen' in the document 1J is not visible. Therefore, the hyperlink 72 is visible by changing the display position of the document 1J.

Figure 24B:
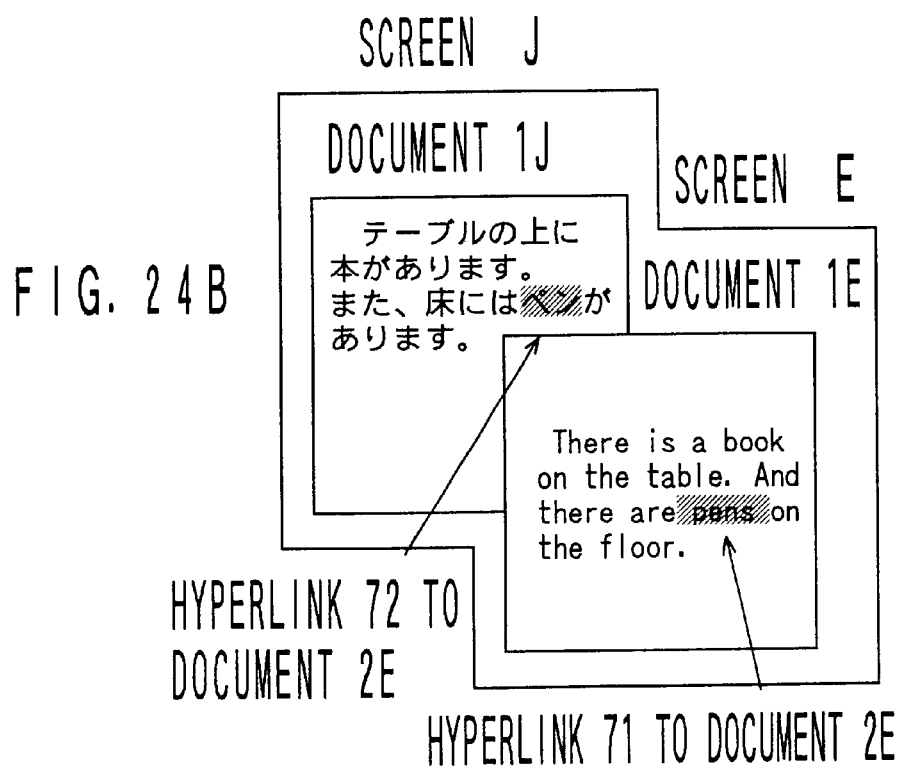
FIG. 24B shows an example of displaying the English-Japanese bilingual document after the display position of the document is adjusted.

FIG. 24B shows an example of displaying an English-Japanese bilingual document after adjusting the display position of the document.

In FIG. 24B, the hyperlink 72 is visible by moving upward the display position of the document 1J 'テーブルの上に本があります。また、床にはペンがあります。'.

Figure 25:
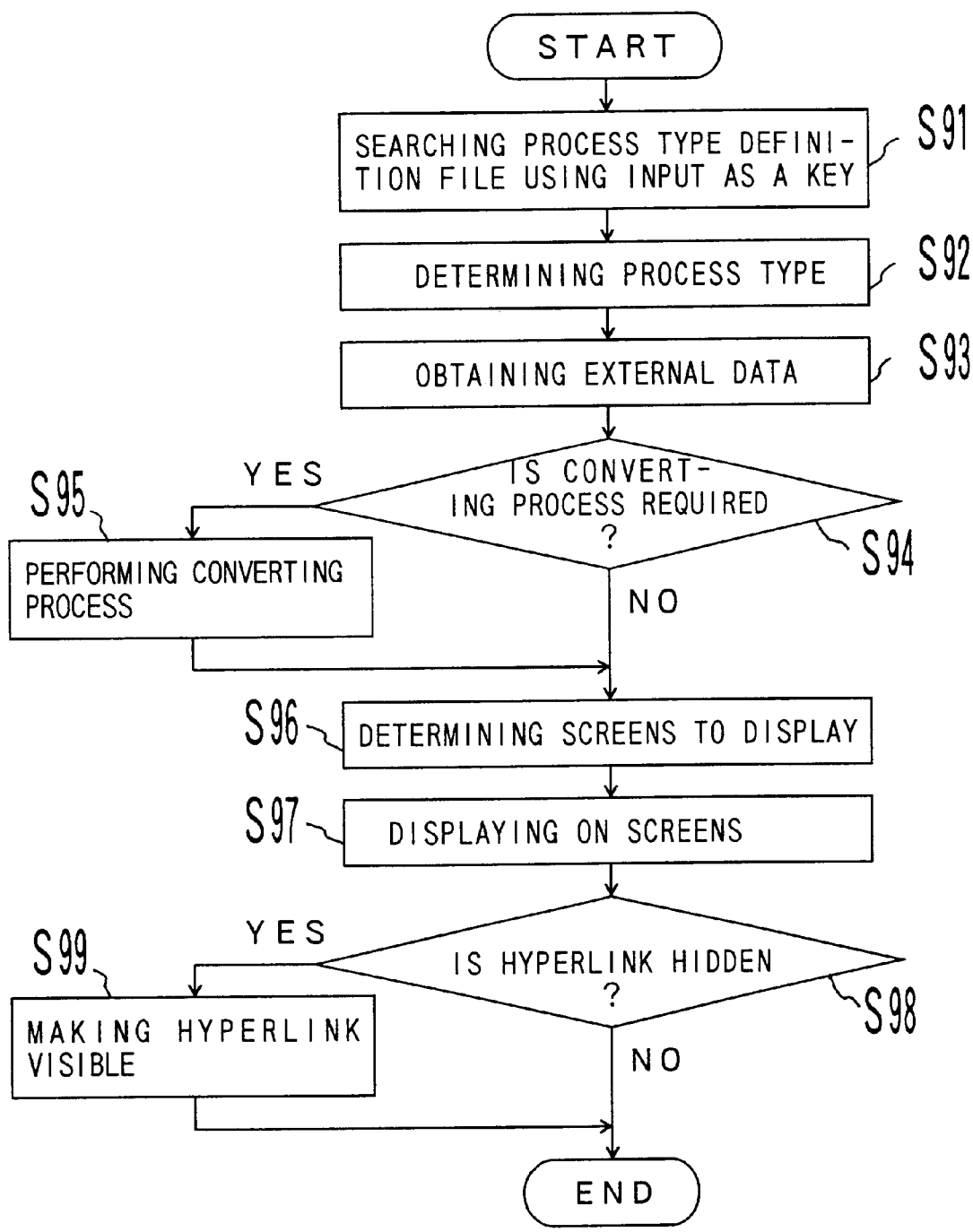
FIG. 25 is a flowchart showing the screen control process according to the eighth embodiment of the present invention.

FIG. 25 is a flowchart showing the screen control process according to the eighth embodiment of the present invention.

In FIG. 25, the process type determination unit 34 searches the process type definition file 35 using as a search key the input received by the input unit 31 and the display type on the screens E, J, K, . . . monitored by the input control unit 33 (step S91).

Then, the process type determination unit 34 determines the process type based on the retrieval result from the process type definition file 35 (step S92).

The data obtaining unit 36 obtains the external data 37 based on the process type determined by the process type determination unit 34 (step S93).

Then, the conversion control unit 39 determines based on the process type whether or not a converting process is required on the obtained external data 37 (step S94). When it is required, any of the conversion devices 38a through 38c corresponding to the process type is activated, and the conversion process is performed (step S95).

Then, the output control unit 40 determines the screens E, J, K, . . . for displaying the external data 37 obtained by the data obtaining unit 36 or the data converted by the converting unit 38 depending on the display type on the screens E, J, K, . . . monitored by the input control unit 33 (step S96).

Then, the output control unit 40 outputs to the display unit 32 the external data 37 obtained by the data obtaining unit 36 or the data converted by the converting unit 38, and displays the output data on the determined screens E, J, K, . . . (step S97).

Then, the output control unit 40 determines whether or not the hyperlinks 71 and 72 are hidden under the screens E, J, K, . . . (step S98). If yes, the hyperlinks 71 and 72 are visible by moving the display position of the documents 1E and 1J containing the hyperlinks 71 and 72 (step S99).

Described below is the screen control process according to the ninth embodiment of the present invention.

FIG. 26 shows the first example of displaying a hyperlink in an English-Japanese bilingual document.

In FIG. 26, the screen E and the screen J are arranged adjacently on the left and right. English data is displayed on the screen E. For example, 'There is a book on the table. And there are pens on the floor.' is a document 1E displayed on the screen E. The document 1E contains a hyperlink 71 to the document 2E. The hyperlink 71 is displayed with diagonal lines at the position of the 'pens' of the document 1E. The hyperlink 71 refers to the document 2E written in English.

Japanese data is displayed on the screen J. An English-Japanese translation result from the document 1E is displayed on the screen J. However, it is assumed that no English-Japanese translation result has been obtained from the document 1E because the document 1E cannot be successfully translated. In this case, the character string 'pens' pointed to by the hyperlink 71 is extracted from the document 1E. Only this character string is translated from English into Japanese. When the English-Japanese translation is successfully performed on the character string 'pens', the character string 'ペン' obtained as a result of the English-Japanese translation is inserted to the screen J as a hyperlink 72 to the document 2E.

Figure 27:
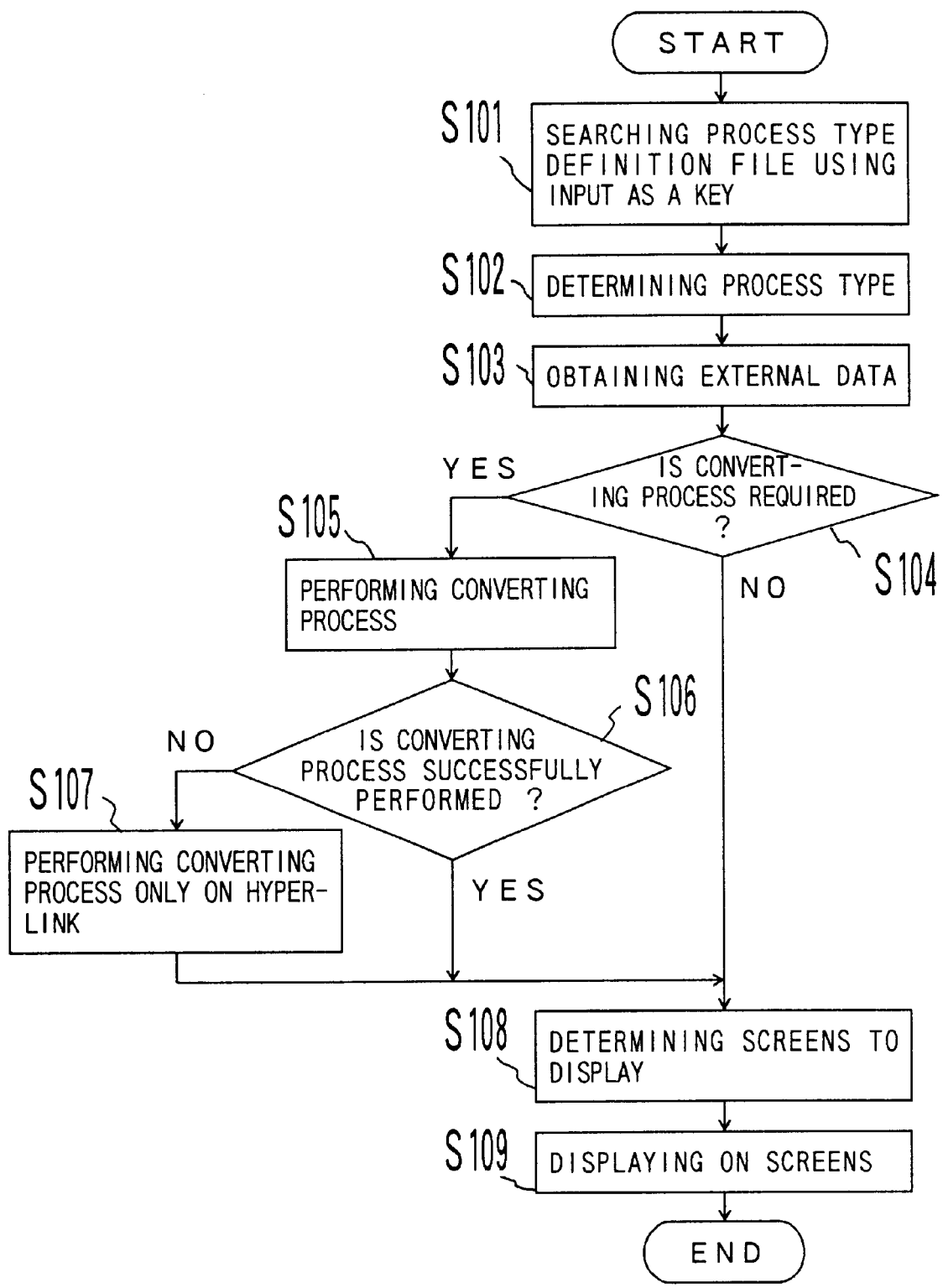
FIG. 27 is a flowchart showing the screen control process according to the ninth embodiment of the present invention.

FIG. 27 is a flowchart showing the screen control process according to the ninth embodiment of the present invention.

In FIG. 27, the process type determination unit 34 searches the process type definition file 35 using as a search key the input received by the input unit 31 and the display type on the screens E, J, K, . . . monitored by the input control unit 33 (step S101).

Then, the process type determination unit 34 determines the process type based on the retrieval result from the process type definition file 35 (step S102).

The data obtaining unit 36 obtains the external data 37 based on the process type determined by the process type determination unit 34 (step S103).

Then, the conversion control unit 39 determines based on the process type whether or not a converting process is required on the obtained external data 37 (step S104). When it is required, any of the conversion devices 38a through 38c corresponding to the process type is activated, and the conversion process is performed (step S105).

Then, the conversion control unit 39 determines whether or not the external data 37 has been successfully converted (step S106). If not, the conversion control unit 39 extracts only the character string corresponding to the hyperlink 71 from the external data 37. Then, it activates any of the conversion devices 38a through 38c corresponding to the process type, and performs the converting process on the hyperlink 71 (step S107).

Then, the output control unit 40 determines the screens E, J, K, . . . for displaying the external data 37 obtained by the data obtaining unit 36 or the conversion result on the hyperlink 71 depending on the display type on the screens E, J, K, . . . monitored by the input control unit 33 (step S108).

Then, the output control unit 40 outputs to the display unit 32 the external data 37 obtained by the data obtaining unit 36 or the conversion result on the hyperlink 71, and displays the output data on the determined screens E, J, K, . . . (step S109).

FIG. 28 shows the second example of displaying a hyperlink in an English-Japanese bilingual document.

In FIG. 28, the screen E and the screen J are arranged adjacently on the left and right. English data is displayed on the screen E. For example, 'There is a book on the table. And there are pens on the floor.' is a document 1E displayed on the screen E. The document 1E contains a hyperlink 71 to the document 2E. The hyperlink 71 is displayed with diagonal lines at the position of the 'pens' of the document 1E. The hyperlink 71 refers to the document 2E written in English.

Japanese data is displayed on the screen J. An English-Japanese translation result from the document 1E is displayed on the screen J. However, it is assumed that no English-Japanese translation result has been obtained from the document 1E because the document 1E cannot be successfully translated. In this case, the character string 'pens' pointed to by the hyperlink 71 is extracted from the document 1E. Only this character string is translated from English into Japanese. When the English-Japanese translation cannot be successfully performed on the character string 'pens', the character string 'pens' corresponding to the hyperlink 71 is inserted as is to the screen J as a hyperlink 72 to the document 2E.

Figure 29:
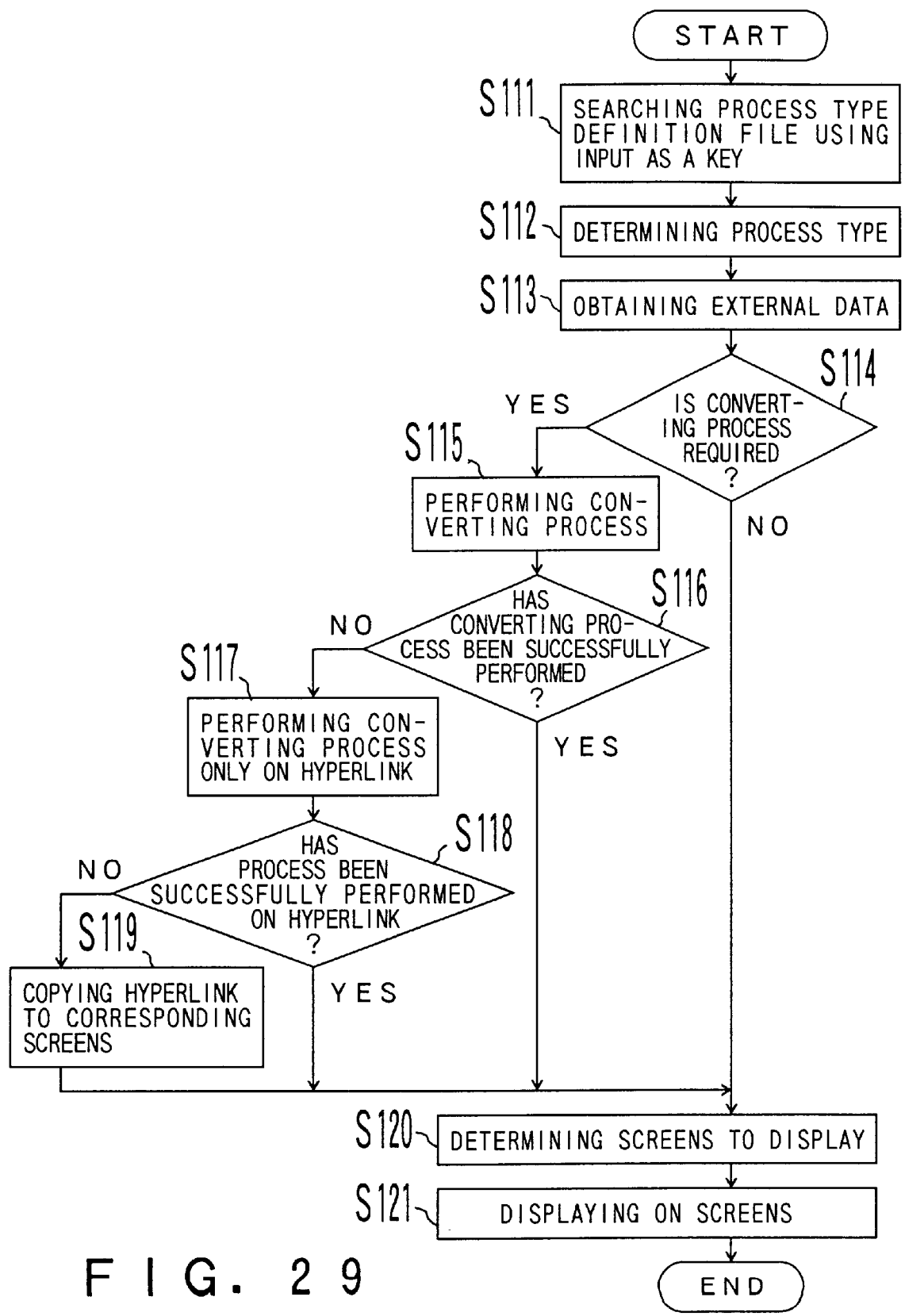
FIG. 29 is a flowchart showing the screen control process according to the tenth embodiment of the present invention.

FIG. 29 is a flowchart showing the screen control process according to the tenth embodiment of the present invention.

In FIG. 29, the process type determination unit 34 searches the process type definition file 35 using as a search key the input received by the input unit 31 and the display type on the screens E, J, K, . . . monitored by the input control unit 33 (step S111).

Then, the process type determination unit 34 determines the process type based on the retrieval result from the process type definition file 35 (step S112).

The data obtaining unit 36 obtains the external data 37 based on the process type determined by the process type determination unit 34 (step S113).

Then, the conversion control unit 39 determines based on the process type whether or not a converting process is required on the obtained external data 37 (step S114). When it is required, any of the conversion devices 38*a* through 38*c* corresponding to the process type is activated, and the conversion process is performed (step S115).

Then, the conversion control unit 39 determines whether or not the external data 37 has been successfully converted (step S116). If not, the conversion control unit 39 extracts only the character string corresponding to the hyperlink 71 from the external data 37. Then, it activates any of the conversion devices 38*a* through 38*c* corresponding to the process type, and performs the converting process on the hyperlink 71 (step S117).

Then, the conversion control unit 39 determines whether or not the hyperlink has been successfully converted (step S118). If not, the conversion control unit 39 copies the hyperlink 71 (step 119).

Then, the output control unit 40 determines the screens E, J, K, . . . for displaying the external data 37 obtained by the data obtaining unit 36 or the hyperlink 71 before the conversion depending on the display type on the screens E, J, K, . . . monitored by the input control unit 33 (step S120).

Then, the output control unit 40 outputs to the display unit 32 the external data 37 obtained by the data obtaining unit 36 or the hyperlink 71 before the conversion, and displays the output data on the determined screens E, J, K, . . . (step S121).

Described below is the screen control process according to the eleventh embodiment of the present invention. According to the eleventh embodiment of the present invention, the contents of the display on one screen is interlocked with the contents of the display on another screen. For example, one screen is automatically scrolled when another screen is scrolled. When a document is edited on one screen, another document can be automatically edited on another screen. For example, when a sentence in a specified area in one document is moved (or copied) to a specified position, a corresponding sentence in another document can be automatically moved (or copied) to a corresponding position. Furthermore, when a sentence in a specified area in one document is deleted, a sentence in a corresponding area in another document can be automatically deleted. When a document is edited, for example, when the contents of a document on one screen is changed, a translating operation can be re-performed only on the changed portion, and the result is displayed on another screen.

Described below is the interlocking scroll on a plurality of screens.

Figure 30A:
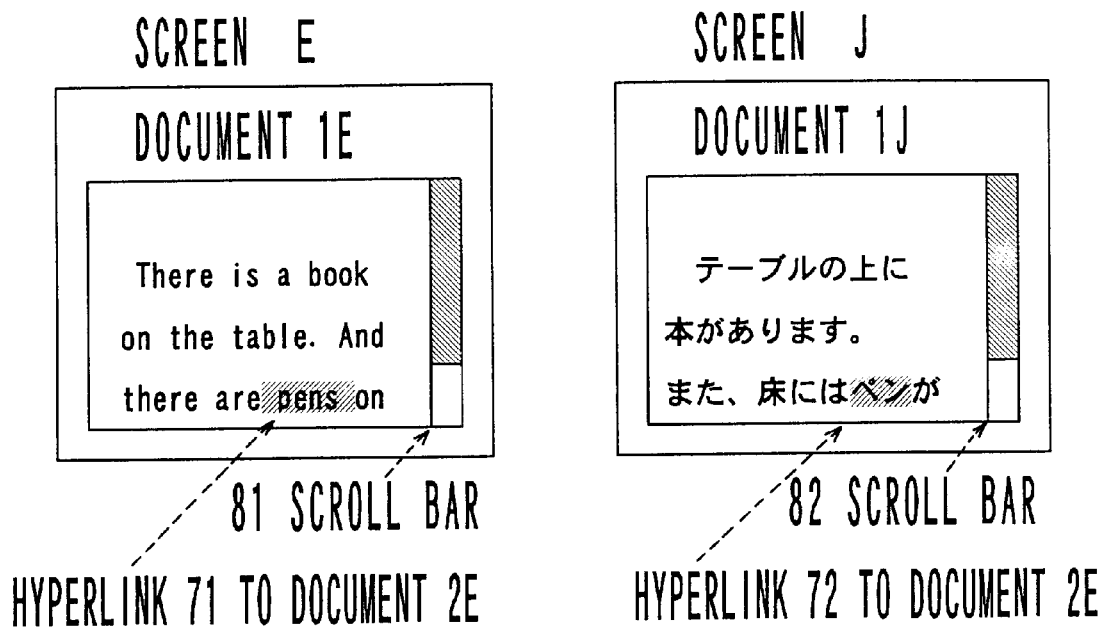
FIG. 30A shows an example of displaying an English-Japanese bilingual document before scrolling.

FIG. 30A shows an example of displaying an English-Japanese bilingual document before a scrolling operation.

In FIG. 30A, the screens E and J are generated adjacently on the right and left. The screen E displays data written in English. For example, the document 1E containing the description 'There is a book on the table. And there are pens on the floor.' is displayed. However, since a part of the document 1E is out of screen, 'the floor.' is not visible.

Japanese data is displayed on the screen J. As an English-Japanese translation result, the Japanese document 1J 'テーブルの上に本があります。また、床にはペンがあります。' is displayed on the screen J. However, since a part of the document 1J is out of screen, 'テーブルの上に本があります。また、床にはペンがあります。' is not visible. The document 1E contains a hyperlink 71 to the document 2E. The hyperlink 71 is displayed with diago- nal lines at the position of the 'pens' of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Therefore, a hyperlink 72 to the document 2E is displayed with diagonal lines at the position of the 'ペン' in the document 1J.

Scroll bars 81 and 82 are provided at the right ends of the bilingual screens E and J respectively. By operating the scroll bars 81 and 82, the screens E and J can be respectively scrolled. By interlocking the scrolling operations between the screens E and J, the displayed data on one screen is changed with the displayed data on another screen changed correspondingly. For example, when the document 1J is scrolled, the corresponding document 1E can be automatically scrolled to the same extent.

Figure 30B:
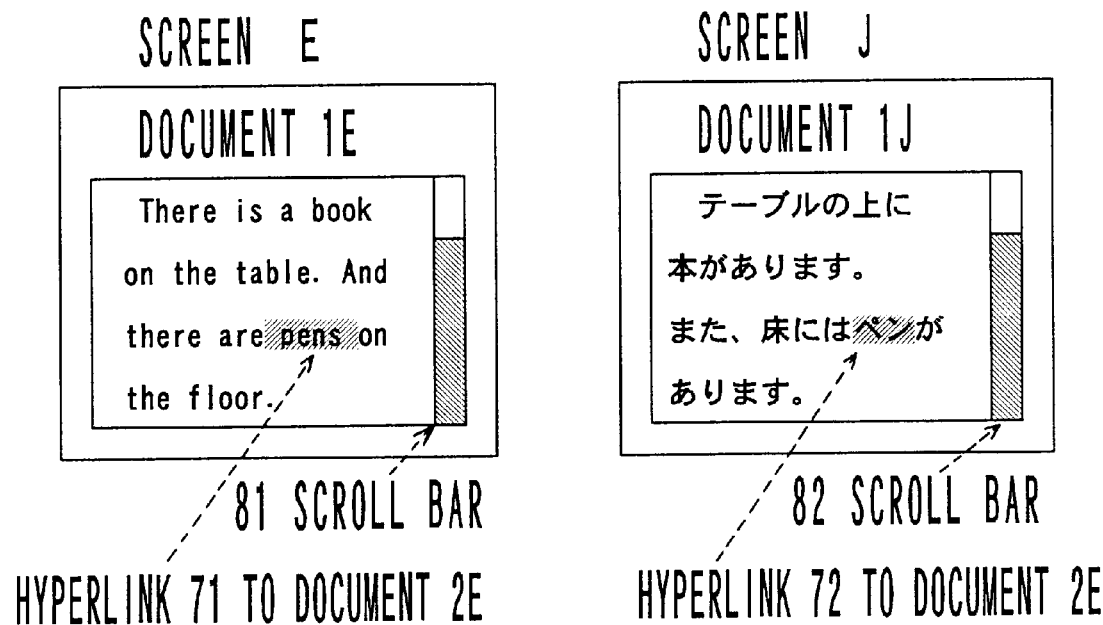
FIG. 30B shows an example of displaying an English-Japanese bilingual document after scrolling.

FIG. 30B shows an example of displaying an English-Japanese bilingual document after a scrolling operation.

In FIG. 30B, as a result of scrolling the document 1E on the screens E, the entire document 1E 'There is a book on the table. And there are pens on the floor.' is displayed on the screen E without putting any part of the document out of screen. As a result of scrolling the document 1J on the screen J as interlocking with the document 1E, the entire document 1J 'テーブルの上に本があります。また、床にはペンがあります。' is displayed on the screen E without putting any part of the document out of screen.

Thus, by scrolling one screen with another screen automatically interlocked, the documents can be checked with the corresponding contents displayed on respective screens.

Described below is the screen control process according to the twelfth embodiment of the present invention. According to the twelfth embodiment of the present invention, the reference history of a hyperlink can be easily checked by displaying the reference record of the hyperlink on the screen.

FIG. 31 shows the third example of displaying a hyperlink in an English-Japanese bilingual document.

In FIG. 31, the screens E and J are generated adjacently on the right and left. The screen E displays data written in. English. For example, the document 1E containing the description 'There is a book on the table. And there are pens on the floor.' is displayed. Japanese data is displayed on the screen J. As an English-Japanese translation result, the Japanese document 1J 'テーブルの上に本があります。また、床にはペンがあります。' is displayed on the screen J.

The document 1E contains a hyperlink 91 to the document 2E. The hyperlink 91 is displayed at the position of the 'pens' of the document 1E. The hyperlink 91 refers to the document 2E written in English. Assuming that the hyperlink 91 has ever been referred to before, a reference record indicator is added. In this embodiment, the hyperlink 91 is emphasized and displayed with a net pattern (or a grate pattern).

When the document 1E is translated into the document 1J, the hyperlink 91 to the document 2E is stored as is in the document 1J, and a hyperlink 92 to the document 2E is embedded at the corresponding position in the document 1J. Therefore, a hyperlink 92 to the document 2E is displayed at the position of the 'ペン' in the document 1J. When the document 1J is obtained by translating the document 1E containing the hyperlink 91 referred to before, the hyperlink 92 is embedded in the document 1J with the reference record of the hyperlink 91 stored. As a result, the hyperlink 92 embedded in the document 1J can also be emphasized and displayed with a net pattern (or a grate pattern) as a reference record indicator.

Figure 32:
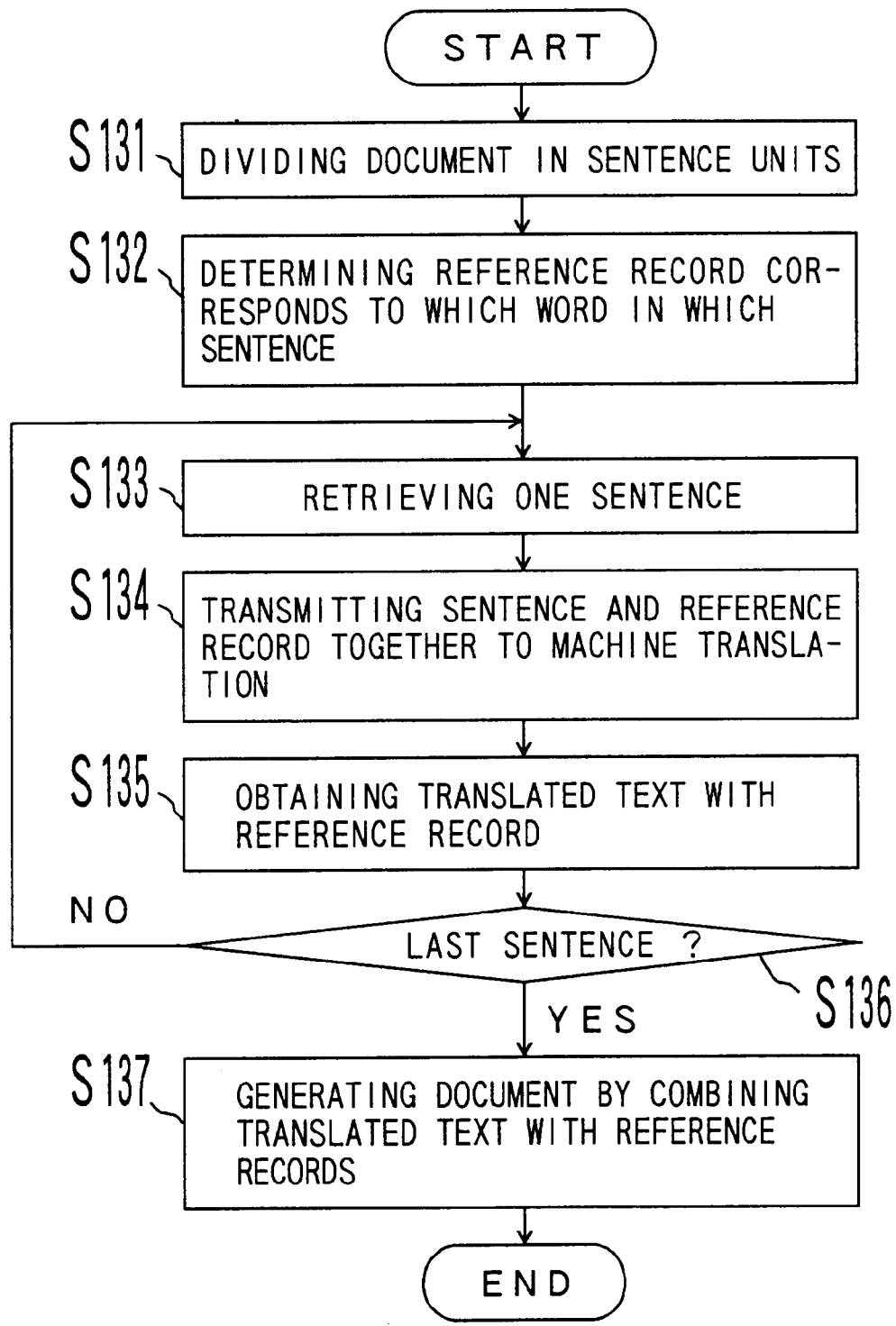
FIG. 32 is a flowchart showing the process of displaying reference records according to an embodiment of the present invention.

FIG. 32 is a flowchart showing the reference record indicating process according to an embodiment of the present invention.

In FIG. 32, an input original document is divided in sentence units (step S131), and it is determined which word in which sentence corresponds to the reference record (step S132).

Then, one sentence is retrieved from the input original document (step S133). The retrieved sentence and the position information about the word having the reference record contained in the sentence are input for machine translation (step S134). For example, if there is a reference record for the 'book' in the original text 'this is a book', then the original text 'This is a book' and the information that there is a reference record for the 'book' are input for machine translation.

Then, a translated text is obtained with a reference record through machine translation (step S135). For example, in machine translation, the translated text 'これは本です。' is generated corresponding to the original text 'This is a book'. Then, according to the information that there is a reference record for the 'book', a reference record is embedded in the '本' corresponding to the 'book'.

If the machine translation has reached the last sentence in the document (step S136), then translated text with reference records is generated as a document (step S137).

FIG. 33 shows the fourth example of displaying a hyperlink in an English-Japanese bilingual document.

In FIG. 33, the screen E and the screen J are arranged adjacently on the left and right. English data is displayed on the screen E. For example, 'There is a book on the table. And there are pens on the floor.' is a document 1E displayed on the screen E.

The document 1E contains a hyperlink 101 to the document 2E. The hyperlink 101 is displayed at the position of the 'pens' of the document 1E. The hyperlink 101 refers to the document 2E written in English. If the operator inputs data to the screen E, the method of displaying the reference record of the hyperlink 101 is changed. As a result, the hyperlink 101 is displayed with horizontal lines.

Japanese data is displayed on the screen J. As an English-Japanese translation result, the Japanese document 1J 'テーブルの上に本があります。また、床にはペンがあります。' is displayed on the screen J. When the document 1E is translated into the document 1J, the hyperlink 71 to the document 2E is stored as is in the document 1J, and the hyperlink 72 to the document 2E is embedded at the corresponding position in the document 1J. If no data is added to the screen J, the hyperlink 72 to the document 2E is displayed with the diagonal lines at the position of the 'ペン' in the document 1J.

Described below is the screen control process according to the twelfth embodiment of the present invention. According to the twelfth embodiment of the present invention, the hyperlinks can be displayed in the same lines by amending the line spacing when the hyperlinks are displayed in different lines between two screens.

FIG. 34A shows the first example of displaying an English-Japanese bilingual document before adjusting the line positions of the hyperlinks.In In FIG. 34A, the screens E and J are generated adjacently on the right and left. The screen E displays data written in English. For example, the document 1E containing the description 'There is a book on the table. And there are pens on the floor.' is displayed. The line spacing in the document 1E displayed on the screen E is set to a smaller value to generate space after the text displayed on the screen E.

Japanese data is displayed on the screen J. As an English-Japanese translation result, the Japanese document 1J 'テーブルの上に本があります。また、床にはペンがあります。' is displayed on the screen J.

The document 1E contains a hyperlink 71 to the document 2E. The hyperlink 71 is displayed with diagonal lines at the position of the 'pens' of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Therefore, a hyperlink 72 to the document 2E is displayed with diagonal lines at the position of the 'ペン' in the document 1J.

The hyperlink 71 displayed on the screen E is different in line position from the hyperlink 72 displayed on the screen J. Therefore, when the 71 is compared with the hyperlink 72, the entire screen J is searched for the hyperlink 72 corresponding to the hyperlink 71. Thus, the hyperlinks 71 and 72 cannot be easily compared.

FIG. 34B shows the first example of displaying an English-Japanese bilingual document after adjusting the line positions of the hyperlinks.

In FIG. 34B, the hyperlink 71 displayed on the screen E matches the hyperlink 72 displayed on the screen J in line position by moving downwards on the screen E the entire text 'There is a book on the table. And there are pens on the floor.' As a result, the display position of the hyperlink 72 corresponding to the hyperlink 71 can be easily anticipated. Thus, the hyperlinks 71 and 72 can be easily compared with each other.

The text display position can be controlled by adjusting the character spacing, the character size, or the line feed position in addition to adjusting the line spacing.

Described below is the screen control process according to the thirteenth embodiment of the present invention. According to the thirteenth embodiment of the present invention, when the line positions of the displayed hyperlinks are different between two screens, the different line positions of the hyperlinks can be adjusted by scrolling one of the screens.

FIG. 35A shows the second example of displaying an English-Japanese bilingual document before adjusting the line positions of the hyperlinks.

In FIG. 35A, the screens E and J are generated adjacently on the right and left. The screen E displays data written in English. For example, the document 1E containing the description 'There is a book on the table. And there are pens on the floor.' is displayed.

Japanese data is displayed on the screen J. As an English-Japanese translation result, the Japanese document 1J 'テーブルの上に本があります。また、床にはペンがあります。' is displayed on the screen J.

The document 1E contains a hyperlink 71 to the document 2E. The hyperlink 71 is displayed with diagonal lines at the position of the 'pens' of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Therefore, a hyperlink 72 to the document 2E is displayed with diagonal lines at the position of the 'ペン' in the document 1J.

Since the position of the screen E is different in vertical direction from the position of the screen J, the hyperlink 71 displayed on the screen E is different in line position from the hyperlink 72 displayed on the screen J. Therefore, when the 71 is compared with the hyperlink 72, the entire screen J is searched for the hyperlink 72 corresponding to the hyperlink 71. Thus, the hyperlinks 71 and 72 cannot be easily compared.

FIG. 35B shows the second example of displaying an English-Japanese bilingual document after adjusting the line positions of the hyperlinks.

In FIG. 35B, the hyperlink 71 displayed on the screen E matches the hyperlink 72 displayed on the screen J in line position by scrolling the document 1J on the screen J. As a result, the display position of the hyperlink 72 corresponding to the hyperlink 71 can be easily anticipated. Thus, the hyperlinks 71 and 72 can be easily compared with each other.

According to the above described embodiment, the hyperlink 71 displayed on the screen E matches the hyperlink 72 displayed on the screen J in line position by scrolling the document 1J on the screen J. Similarly, the hyperlink 71 displayed on the screen E can match the hyperlink 72 displayed on the screen J in line position by scrolling the document 1E on the screen E.

Described below is the screen control process according to the fourteenth embodiment of the present invention. According to the fourteenth embodiment of the present invention, the hyperlinks can be displayed at the same columns by amending the display positions when the hyperlinks are displayed at different columns between two screens.

FIG. 36A shows an example of displaying an English-Japanese bilingual document before adjusting the column positions of the hyperlinks.

In FIG. 36A, the screens E and J are generated adjacently on the right and left. The screen E displays data written in English. For example, the document 1E containing the description 'There is a book on the table. And there are pens on the floor.' is displayed.

Japanese data is displayed on the screen J. As an English-Japanese translation result, the Japanese document 1J 'テーブルの上に本があります。また、床にはペンがあります。' is displayed on the screen J.

The document 1E contains a hyperlink 71 to the document 2E. The hyperlink 71 is displayed with diagonal lines at the position of the 'pens' of the document 1E. The hyperlink 71 refers to the document 2E written in English.

When the document 1E is translated into the document 1J, the hyperlink 71 to the document 2E is stored as is in the document 1J, and the hyperlink 72 to the document 2E is embedded at the corresponding position in the document 1J. Therefore, a hyperlink 72 to the document 2E is displayed with diagonal lines at the position of the 'ペン' in the document 1J.

The hyperlink 71 displayed on the screen E is different in column position from the hyperlink 72 displayed on the screen J. Therefore, the hyperlinks 71 and 72 cannot be easily compared.

FIG. 36B shows an example of displaying an English-Japanese bilingual document after adjusting the column positions of the hyperlinks.

In FIG. 36B, the hyperlink 71 displayed on the screen E matches the hyperlink 72 displayed on the screen J in column position by adjusting the column position of a part of a sentence containing the hyperlink 72. As a result, the display position of the hyperlink 72 corresponding to the hyperlink 71 can be easily anticipated. Thus, the hyperlinks 71 and 72 can be easily compared with each other.

According to the above described embodiment, the hyperlink 71 displayed on the screen E matches the hyperlink 72 displayed on the screen J in column position by adjusting the column position of a part of a sentence containing the hyperlink 72. Similarly, the hyperlink 71 displayed on the screen E can match the hyperlink 72 displayed on the screen J in column position by adjusting the column position of a part of a sentence containing the hyperlink 71.

Described above are the embodiments of the present invention. However, the present invention is not limited to the above described embodiments, but can be applied to various applications within the range of the technological concept of the present invention. For example, according to the above described embodiments, the operations are performed on an English-Japanese bilingual screen. When voice data is contained in the document referred to by a hyperlink, the voice can be output in English and Japanese alternately.

According to the present invention, as described above, if data is converted between the first data and the second data, the converting process performed on the first data can also be performed on the third data relevant to the first data so that the third data relevant to the first data can be output in the same data type as the second data.

According to an aspect of the present invention, when a hyperlink in the original text is processed with the original text and the translated text containing the hyperlinks displayed in the bilingual format, the document referred to by the hyperlink can be output. with the original text and the translated text in the bilingual format by translating and outputting the document referred to by the hyperlink, According to a further aspect of the present invention, the following processes can be realized by switching referred-from original text and translated text and referred-to original text and translated text on an output screen. That is, the original text referred from by the hyperlink and the translated text can be output in the bilingual format. The original text and the translated text referred to by the hyperlink can also be output in the bilingual format. Furthermore, the original text referred from by the hyperlink and the translated text referred to by the hyperlink can be output in the bilingual format. The original text referred to by the hyperlink and the translated text referred from by the hyperlink can also be output in the bilingual format. Thus, various display methods can be realized according to the present invention.

According to a further aspect of the present invention, a first display screen for displaying original text and a second display screen for displaying translated text are provided. When a document referred to on the second display screen is described in the language of the original text, the referred-to document is first translated and then displayed on the second display screen. As a result, when a hyperlink is processed, the document can be displayed in the same language on the same screen, thereby preventing the document from being represented in different languages on the same screen.

According to a further aspect of the present invention, referred-to information is displayed on a plurality of screens in an interlocking manner. Therefore, a document can be operated on one screen to display the information referred to on other screens, thereby easily displaying the referred-to information on a plurality of screens.

According to a further aspect of the present invention, the process type of a hyper-document data can be determined based on the display format of a specified display screen, and a conversion control can be performed on a referred-to document data of hyper-document data. As a result, the document referred to by a hyperlink can be represented as translated text even if the hyperlink of the original text is embedded as is in the translated text, the document referred to by the hyperlink embedded in the original text is described in the language of the original text, and the hyperlink is processed in the translated text. As a result, the referred-to document can be displayed in the language of the original text on the screen on which the original text is displayed, and the referred-to document can be displayed in the language of the translated text on the screen on which the translated text is displayed. Thus, a document written in different languages can be prevented from being displayed in the different languages on the same screen.

According to a further aspect of the present invention, a process result of referred-to document data can be simultaneously displayed on a display screen when the referred-to document data is displayed on another display screen. Thus, the referred-to document data before the conversion of the data and the referred-to document data after the conversion of the data can be displayed in the comparison format, thereby improving the convenience of the user.

According to a further aspect of the present invention, even if the hyperlink of the original text is embedded as is in the translated text and the language of the document referred to by the hyperlink embedded in the original text is not known, the language of the document referred to by the hyperlink is determined, and the referred-to document is translated and displayed, thereby improving the convenience of the user.

According to a further aspect of the present invention, the language type of the document data can be easily determined by checking the ratio of the character type contained in the document data.

According to a further aspect of the present invention, a new screen is generated when a screen corresponding to the document type does not exist.

Thus, document data can be displayed for each document type, and different types of documents can be displayed in the comparison format.

According to a further aspect of the present invention, the output order of document data can be controlled based on the process time of the obtained document data. Thus, it is possible to prevent the output of the document data obtained within a short period from being delayed by the document data which takes a long time, thereby efficiently outputting document data.

According to a further aspect of the present invention, the document data can be obtained and simultaneously converted. Therefore, it is not necessary to keep the document data converting process waiting until the entire data is obtained. As a result, the conversion result of the document data can be quickly output.

According to a further aspect of the present invention, a character code displayed on each screen can be controlled for each description language by providing a character code correspondence table.

According to a further aspect of the present invention, the referred-to document data can be easily accessed by controlling the display position of the hyper-document data such that the hyperlink is visible, even when the screens of hyper-document data overlap each other for display.

According to a further aspect of the present invention, only a hyperlink of hyper-document data can be converted and displayed when the hyper-document data cannot be successfully converted. As a result, the hyperlink and the conversion result can be compared, thereby easily accessing the referred-to document data.

According to a further aspect of the present invention, a hyperlink before the conversion is displayed when the hyper-document data and the hyperlink cannot be successfully converted. Thus, the referred-to document data can be accessed in the comparison format on the screen even if a conversion result cannot be obtained from the hyper document data.

According to a further aspect of the present invention, the corresponding portions between the data before conversion and the data after conversion can be simultaneously displayed. Therefore, when one screen is scrolled, another screen can be automatically scrolled, thereby improving the convenience of the user.

According to a further aspect of the present invention, the corresponding portions between the data before conversion and the data after conversion can be displayed at the same position on each screen. Therefore, a specified word or sentence in the original text displayed on one screen can be easily located in the translated text displayed on another screen, there improving the convenience of the user.

According to a further aspect of the present invention, the correspondence of the hyperlinks can be easily obtained by making the display positions of the hyperlinks match between the relevant screens.

According to a further aspect of the present invention, the character size, character spacing, line spacing, or line feed position can be controlled to set the position at which data is displayed. Thus, even if the numbers of characters are different between the original text and the translated text, the corresponding portions between the original text and the translated text can be displayed on the same position on each screen by reducing the character size, character spacing, line spacing, or number of line feeds of the text containing a larger number of characters.

According to a further aspect of the present invention, the display positions of hyperlinks can easily match each other between relevant screens by scrolling the document data on the screen.

According to a further aspect of the present invention, the reference record display of referenced hyperlinks can also be displayed on another screen. Therefore, the reference record can be displayed on any relevant screen, thereby improving the convenience in referring to relevant information.

According to a further aspect of the present invention, the method for displaying a referenced hyperlink is different from the method for displaying a non-referenced hyperlink. Thus, a hyperlink referenced before can be easily identified, thereby improving the convenience when relevant information is requested.

According to a further aspect of the present invention, the size of a screen can be controlled depending on the amount of data before and after conversion. Thus, even if the numbers of characters are different between the original text and the translated text, the corresponding portions of the original text and the translated text can be displayed in the corresponding line on the screens by setting the width of the screen for a document containing a larger number of characters longer than the width of the screen for another document having a smaller number of characters, thereby improving the convenience of the user when the original text and the translated text are displayed in the bilingual format on the screen.

While the invention has been described with reference to the preferred embodiments thereof, various modifications and changes may be made to those skilled in the art without departing from the true spirit and scope of the invention as defined by the claims thereof.

What is claimed is:

1. An output control apparatus, comprising:
    a process type information obtaining unit obtaining process type information for use in converting first data into second data;
    a referred-to data obtaining unit obtaining third data referred to by the first data;
    a reference information conversion unit converting the third data into fourth data based on said process type information; and
    an output control unit controlling output of the first data through the fourth data, wherein
    a link corresponding to that of the first data is embedded in the second data,
    a said output control unit controls output of the third data when the link in the first data is referenced, and controls output of the fourth data when the link in the second data is referenced.

2. The apparatus according to claim 1, wherein:
    said process type refers to a translating process or a dictionary searching process.

3. The apparatus according to claim 1, wherein said output control unit comprises:
    a first display control unit displaying the first data and the second data in a comparison format; and
    a second display control unit displaying the third data and the fourth data in a comparison format when the third data is referred to.

4. An output control apparatus, comprising:
    a display unit provided with a plurality of display screens;
    an input control unit monitoring a display mode on the display screens;
    a process type determination unit determining a process type of hyper-document data based on the display mode of a specified display screen;
    a data obtaining unit obtaining document data referred to by the hyper-document data;
    a process type definition file storing process contents of the referred-to document data corresponding to the process type;
    a conversion control unit controlling conversion of document data referred to by the hyper-document data based on process contents of said process type, definition file; and
    an output control unit outputting a process result of the referred-to document data to the specified display screen.

5. The apparatus according to claim 4, further comprising:
    a screen synchronization control unit displaying a process result of a document data referred to by the hyper-document data on another display screen synchronized with a display of the referred-to document data.

6. The apparatus according to claim 4, further comprising:
    a document type determination unit determining a document type of the document data; and
    a document type control unit making a document type of referred-to document data match a document type of referred-from document, and displaying the document data on a specified screen.

7. The apparatus according to claim 6, wherein said document type determination unit comprises:
    a language type determination unit determining a language type of the document data by checking a rate of a type of characters contained in the document data.

8. The apparatus according to claim 4, further comprising:
    a display state management unit managing a display state of a screen for each document type; and
    a screen generation unit generating a new screen when no screens exist for the document type.

9. The apparatus according to claim 4, further comprising:
    a display order control unit controlling an output order of document data based on a process time of the document data obtained from said data obtaining unit.

10. The apparatus according to claim 4, further comprising:
    a required time determination unit determining a time required to obtain document data obtained from said data obtaining unit; and
    a partial data conversion control unit starting a converting process on a part of the document data when the required time exceeds a predetermined value.

11. The apparatus according to claim 4, further comprising:
    a character code correspondence table on which a character code to be displayed on a screen is defined for each screen; and
    a character code control unit controlling the character code displayed on each screen by referring to said character code correspondence table.

12. The apparatus according to claim 4, further comprising:
    a hyperlink detection unit detecting a display state of a hyperlink of the hyper-document data; and
    a display position control unit controlling a display position of the hyper-document data such that the hyperlink can be visible when the hyperlink is hidden under another screen.

13. The apparatus according to claim 3, further comprising:
    a first approval determination unit determining whether the hyper-document data has been successfully converted;
    a conversion instruction unit specifying conversion of a hyperlink of the hyper-document data if the hyper-document data has been unsuccessfully converted; and
    a first display instruction unit specifying a display of a conversion result of the hyperlink.

14. The apparatus according to claim 13, further comprising:
    a second approval determination unit determining whether the hyperlink has been successfully converted; and
    a second display instruction unit specifying a display of a hyperlink before conversion if the hyperlink has been unsuccessfully converted.

15. The apparatus according to claim 4, further comprising:

a first display control unit synchronously displaying corresponding portions between data before conversion and after conversion.

16. The apparatus according to claim 4, further comprising:
a second display control unit displaying, at approximately same positions on screens, portions corresponding between data before and after conversion by controlling a display format for each screen.

17. The apparatus according to claim 4, further comprising:
a third display control unit matching display positions of hyperlinks by changing a display format of document data when the display positions of the hyperlinks are different between a screen for displaying document data before conversation and a screen for displaying document data after conversion.

18. The apparatus according to claim 16, wherein
said display format refers to a character size, character spacing, line spacing, or a line feed position.

19. The apparatus according to claim 4, further comprising:
a fourth display control unit matching display positions of hyperlinks by scrolling document data on the screen when the display positions of the hyperlinks are different between a screen for displaying document data before conversion and a screen for displaying document data after conversion.

20. The apparatus according to claim 4, further comprising:
a fifth display control unit displaying a reference record of a hyperlink on another screen having a hyperlink referring to the same referred-to target.

21. The apparatus according to claim 4, further comprising:
a sixth display control unit controlling a method of displaying a referred-to hyperlink to be different from a method of displaying a hyperlink not referred to.

22. The apparatus according to claim 4, further comprising:
a screen control unit controlling a size of a screen corresponding to a volume of data before and after conversion.

23. An output control method, comprising:
providing a display with a plurality of display screens;
monitoring a display mode on the display screens;
determining process type of hyper-document data based on the display mode of a specified display screen;
obtaining referred-to document data referred to by the hyper-document data;
storing process contents of the referred-to document data corresponding to the process type in a process type definition file;
controlling conversion of the referred-to document data referred to by the hyper-document data based on process contents of the process type definition file; and
outputting a conversion result of the referred-to document data to the specified display screen.

24. A computer-readable storage medium storing a program used to direct a computer to perform:
providing a display with a plurality of display screens;
monitoring a display mode on the display screens;
determining process type of hyper-document data based on the display mode of a specified display screen;
obtaining referred-to document data referred to by the hyper-document data;
storing process contents of the referred-to document data corresponding to the process type in a process type definition file;
controlling conversion of the referred-to document data of the hyper-document data based on the process contents of the process type definition file; and
controlling output of a conversion result so as to output the conversion result of the referred-to document data to the specified display screen.

25. An output control method, comprising:
obtaining process type information for use in converting first data into second data;
obtaining third data referred to by the first data;
converting the third data into fourth data based on said process type information; and
controlling output of the first data through the fourth data, wherein
when the link in the first data is referenced, the third data is controlled to be output and when the link in the second data is referenced, the fourth data is controlled to be output.

26. A computer-readable storage medium storing a program used to direct a computer to perform:
obtaining process type information for use in converting first data into second data;
obtaining third data referred to by the first data;
converting the third data into fourth data based on said process type information; and
controlling output of the first data through the fourth data, wherein
link corresponding to that of the first data is embedded in the second data,
when the link in the first data is referenced, the third data is controlled to be output and when the link in the second data is referenced, the fourth data is controlled to be output.

* * * * *